United States Patent [19]

Oyamada et al.

[11] 4,387,332

[45] Jun. 7, 1983

[54] APPARATUS FOR SUCCESSIVELY CHARGING RECHARGEABLE BATTERIES

[75] Inventors: Kenji Oyamada, Yawata; Kotaro Matsuura, Hirakata, both of Japan

[73] Assignee: Sanyo Electric Co., Ltd., Moriguchi, Japan

[21] Appl. No.: 228,684

[22] Filed: Jan. 26, 1981

[30] Foreign Application Priority Data

| Jan. 29, 1980 | [JP] | Japan | 55-9514 |
| Jan. 31, 1980 | [JP] | Japan | 55-11069 |
| Jan. 31, 1980 | [JP] | Japan | 55-11072 |
| May 23, 1980 | [JP] | Japan | 55-69127 |
| May 28, 1980 | [JP] | Japan | 55-72062 |
| Jul. 30, 1980 | [JP] | Japan | 55-105640 |
| Aug. 4, 1980 | [JP] | Japan | 55-107577 |

[51] Int. Cl.³ .............................................. H02J 7/04
[52] U.S. Cl. ........................................ 320/15; 320/40
[58] Field of Search ..................... 320/2, 3, 5, 6, 15, 320/19–21, 39, 40, 48

[56] References Cited

U.S. PATENT DOCUMENTS

| 3,786,343 | 1/1974 | Ehlers | 320/48 X |
| 4,016,474 | 4/1977 | Mason | 320/21 X |
| 4,118,661 | 10/1978 | Siekierski et al. | 320/40 |
| 4,134,056 | 1/1979 | Fukui et al. | 320/20 |

Primary Examiner—A. D. Pellinen
Attorney, Agent, or Firm—Darby & Darby

[57] ABSTRACT

A charging apparatus charges a plurality of rechargeable batteries individually and in succession. Each of the plurality of rechargeable batteries is coupled to one corresponding charging branch. The charging apparatus comprises a charging completion detecting circuit for detecting a charging completion of a rechargeable battery now in a charging operation, a high voltage detecting circuit for detecting an abnormal voltage of a charging branch now in a charging operation, wherein single pulse is generated responsive to the outputs of the charging completion detecting circuit and the abnormal voltage detecting circuit. A charging branch being connected to the charging voltage source is selectively and automatically switched responsive to the above described single pulse. Furthermore, the charging completion detecting circuit and the abnormal voltage detecting circuit are reset to an initial state responsive to the above described single pulse.

23 Claims, 60 Drawing Figures

BATTERY VOLTAGE

STORED VOLTAGE

VOLTAGE DIFFERENCE

OUTPUT OF 14

PULSE FROM 15

OUTPUT OF 7 { $Q_1$, $Q_2$, $Q_3$, ..., $Q_{n-1}$, $Q_n$ }

TIMING PULSE TP

OUTPUT OF 14

PULSE SIGNAL PS

STORED VOLTAGE

RESET

OUTPUT OF P2

OUTPUT OF P1

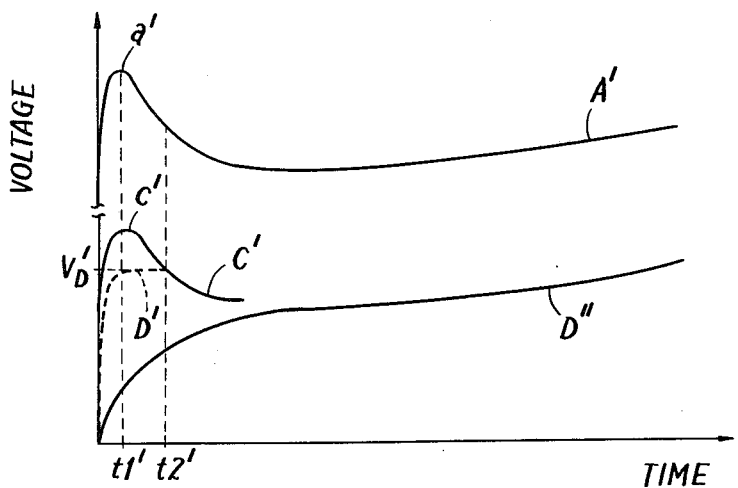
FIG. 9
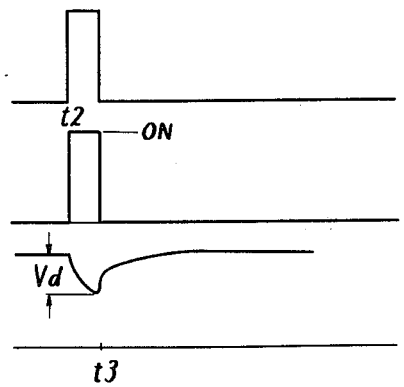
FIG. 10A  OUTPUT OF 12
FIG. 10B  ON/OFF STATE OF 161
FIG. 10C  VOLTAGE OF 131
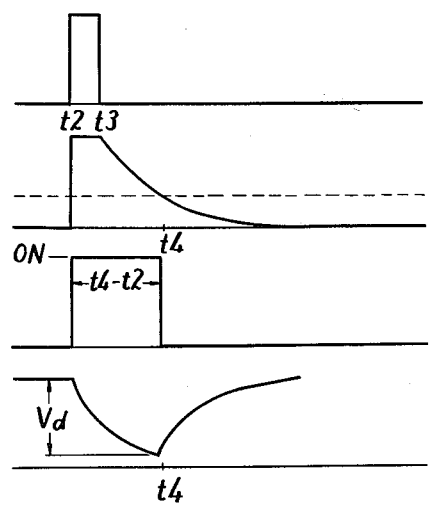
FIG. 11A  OUTPUT OF 12
FIG. 11B  TERMINAL VOLTAGE OF 163
FIG. 11C  ON/OFF STATE OF 161
FIG. 11D  VOLTAGE OF 131

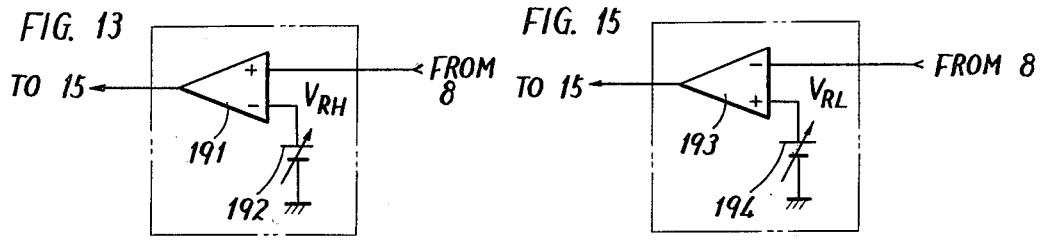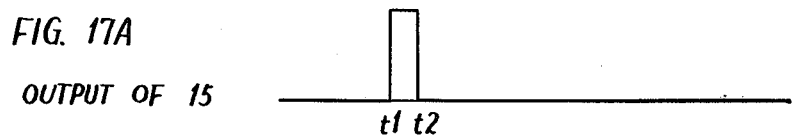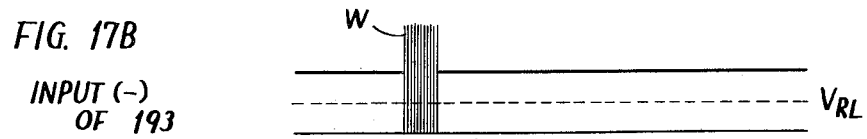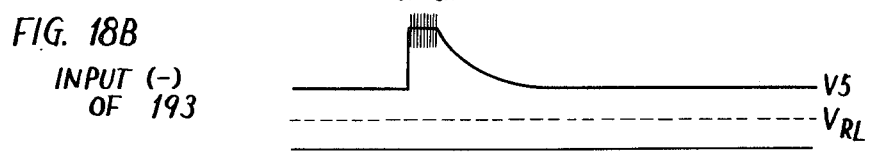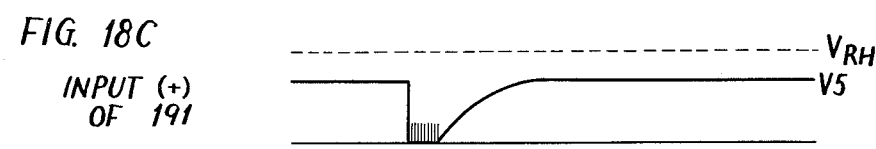

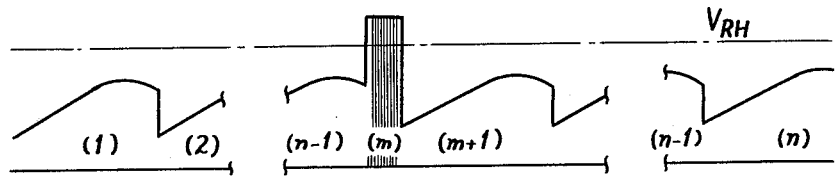
FIG. 14A APPLIED VOLTAGE TO 18'
FIG. 14B BATTERY VOLTAGE
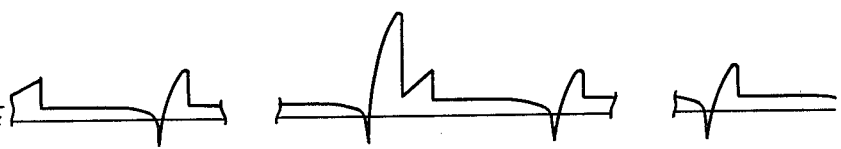
FIG. 14C VOLTAGE DIFFERENCE
FIG. 14D OUTPUT OF 14
FIG. 14E OUTPUT OF OSC IN 1
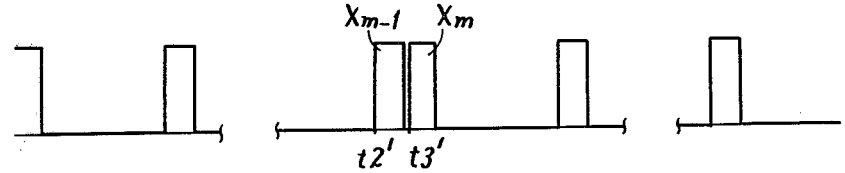
FIG. 14F PULSE FROM 15
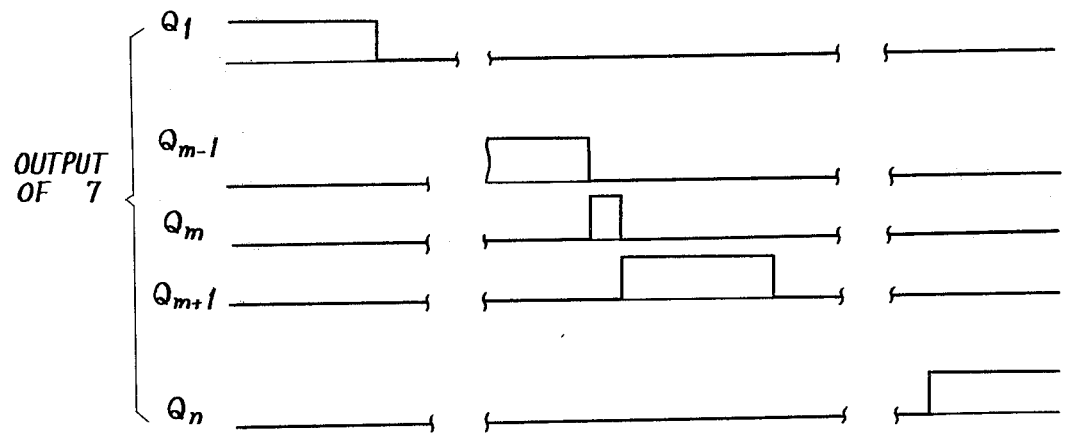
FIG. 14G OUTPUT OF 7

FIG. 20A
APPLIED VOLTAGE TO 18' 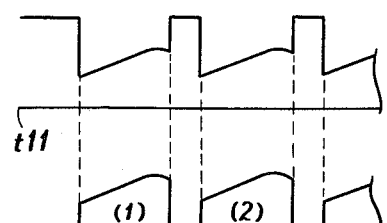 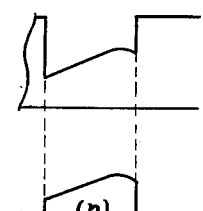
t11
FIG. 20B
VOLTAGE AT 1c 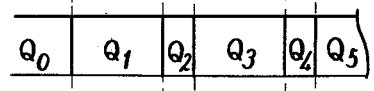 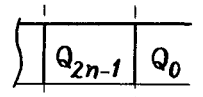
(1) (2) (n)
FIG. 20C
OUTPUT OF 71 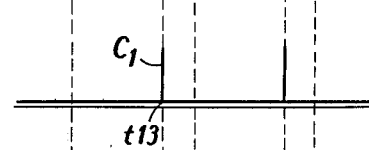 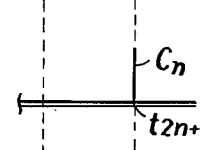
$Q_0$ $Q_1$ $Q_2$ $Q_3$ $Q_4$ $Q_5$ ... $Q_{2n-1}$ $Q_0$
FIG. 20D
OUTPUT OF 14 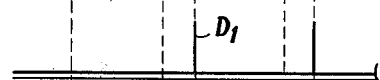 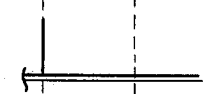
$C_1$ $C_n$
t13 t2n+1
FIG. 20E
OUTPUT OF 191  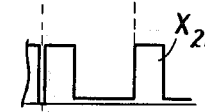
$D_1$
t14
FIG. 20F
OUTPUT OF 15 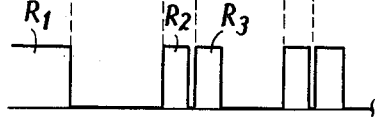 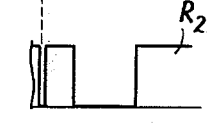
$X_1$ $X_2$ $X_{2n-1}$
FIG. 20G
OPERATION OF 16/201  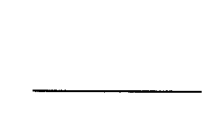
$R_1$ $R_2$ $R_3$ $R_{2n-1}$
FIG. 20H
OUTPUT OF 73
t12

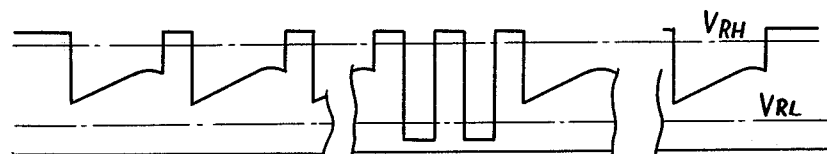
FIG. 21A APPLIED VOLTAGE TO 18'
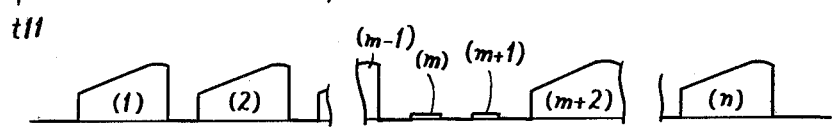
FIG. 21B VOLTAGE AT 1c
FIG. 21C OUTPUT OF 71
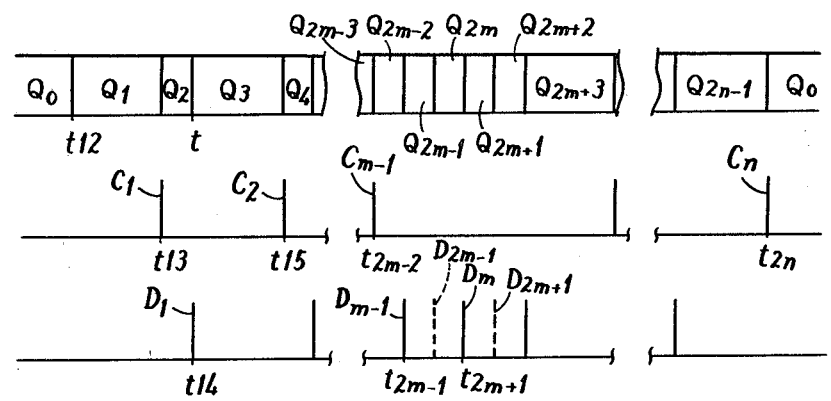
FIG. 21D OUTPUT OF 14
FIG. 21E OUTPUT OF 191
FIG. 21F OUTPUT OF 193
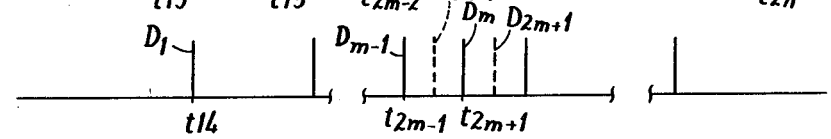
FIG. 21G OUTPUT OF 15
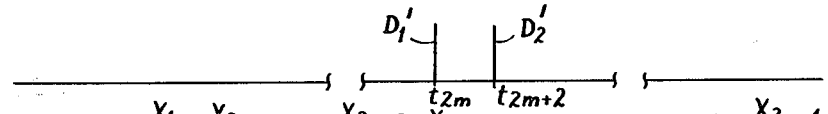
FIG. 21H OPERATION OF 16/201
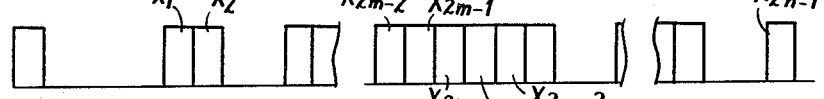
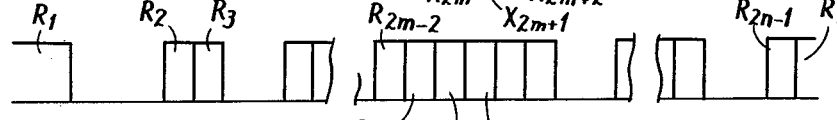

APPARATUS FOR SUCCESSIVELY CHARGING RECHARGEABLE BATTERIES

BACKGROUND OF THE INVENTION

1. Field of the Invention

The present invention relates to a charging apparatus. More specifically, the present invention relates to a charging apparatus for charging a rechargeable battery adapted for charging in succession and individually a plurality of rechargeable batteries.

2. Description of the Prior Art

Conventionally a series charging system has been proposed as a system for charging a plurality of rechargeable batteries. According to a series charging system, a charging current of the same magnitude is applied to a plurality of series connected batteries. Accordingly, a problem is involved in the series charging system that if and when the remaining quantity of electricity is different from battery to battery one is overcharged while the other is undercharged, with the result that all the batteries cannot be equally charged. In order to eliminate such problem encountered in the series charging system, a parallel charging system may be considered. According to such parallel charging system, a charging current is individually applied to each of a plurality of batteries connected in parallel. Therefore, such parallel charging system requires that a charging completion detecting means necessary in rapid charging, in particular, is provided for each of the batteries, which entails another problem that a charging apparatus itself becomes expensive and large sized.

On the other hand, it has been well-known that a gas tight sealed battery such as a nickel-cadmium battery exhibits a charging characteristic as shown in FIG. 1. The charging quantity characteristic of such gas tight sealed battery exhibits a change as shown by the curve B in FIG. 1, in which the saturated state is a fully charged state of the battery. The charging voltage characteristic of such gas tight sealed battery is shown by the curve A in FIG. 1, which exhibits an increase until a peak (as denoted as a) shortly before a fully charged state is reached and thereafter exhibits a gradual decrease until a fully charged state is reached. Therefore, if and when a simple approach is employed to interrupt a charging current by detecting a charged state of a battery in rapid charging as described previously, an overcharged state or an undercharged state results. Therefore, a specific charging state detecting means is required for detecting a charging completion in accordance with the above described charging characteristic by detecting a battery voltage, a temperature and/or an internal gas pressure, for example. In the case of the above described parallel charging system, such charging state detecting means is required for each of the batteries and again the apparatus becomes expensive and large sized.

SUMMARY OF THE INVENTION

Briefly described, the present invention comprises a charging apparatus including a plurality of charging branches each including a battery, wherein a charging state of a battery now in a charging operation out of a plurality of batteries is detected and the charging branch being supplied with a charging current from a charging voltage source is selectively and automatically switched responsive to the detected output. According to the present invention, the plurality of batteries are charged in succession and individually and the charging state is detected for each battery being charged. Therefore, each battery is charged to an optimum charged quantity even if the remaining quantity of electricity is different from battery to battery. Since only one means for detecting a charging state of each battery may be employed commonly to a plurality of batteries, a charging apparatus can be made small sized.

A preferred embodiment of the present invention is directed to a charging apparatus of gas tight sealed batteries such as nickel-cadmium batteries. A charging voltage of such a gas tight sealed battery exhibits an increase until a peak shortly before a fully charged state is reached and thereafter exhibits a gradual decrease until a fully charged state is reached. Therefore, in a preferred embodiment of the present invention, such charging state detecting means is adapted to store a predetermined constant voltage corresponding to the peak of the charging voltage characteristic and to compare the stored voltage with a voltage after the peak of the charging characteristic, thereby to detect a fully charged state, i.e. a charging completion. According to this preferred embodiment of the present invention, a charging completion can be detected with a relatively high accuracy and, even if the remaining quantity of electricity of each of the batteries is not the same, the charging quantity of each of all the batteries may be close to a fully charged quantity.

In another preferred embodiment of the present invention, abnormal voltage detecting means is provided in a charging branch as switched to be supplied with a charging current from a charging voltage source out of a plurality of charging branches for the purpose of detecting whether an abnormal voltage has occurred. A supply of a charging current to the charging branch is immediately stopped responsive to the detected output from such abnormal voltage detecting means, whereupon another charging branch is connected to the charging voltage source. According to the preferred embodiment of the present invention, an abnormal state such as in the case where an abnormally high voltage is developed in a charging branch when a battery being included in that charging branch has not been properly mounted, in the case where an abnormally low voltage is developed in the charging branch when the battery being charged is internally short-circuited, and the like is detected with promptitude. A supply of a charging current to such abnormal charging branch is stopped responsive to the detected output and a supply of a charging current to another charging branch is started with promptitude. As a result, a charging time period required for charging all the batteries can be shortened. In addition, batteries and other components of the charging apparatus can be effectively prevented from being damaged due to such abnormality in the charging branch.

In a further preferred embodiment of the present invention, charging state detecting means and/or abnormal voltage detecting means are reset to an initial state responsive to the selective switching of the charging branches. Therefore, according to the embodiment, a charging state of a battery included in the charging branch and an abnormal voltage occurring in the charging branch can be detected with accuracy and certainty for each of the charging branches. In addition, according to the preferred embodiment, the detecting circuit is prevented from making malfunction due to a ripple current from the charging voltage source on the occasion of switching of the charging branches or an influence of the switching signal.

In still a further preferred embodiment of the present invention, the charging state detecting means is reset at an initial state. By thus resetting the detecting means incidental to initiation of a charging operation, the detecting means is automatically retained in a reset state when the charging voltage source is turned on or on the occasion of a charging completion and therefore the charging state detecting means and the automatic switching means are effectively prevented from making malfunction or self-running operation.

Accordingly, a principal object of the present invention is to provide an improved charging apparatus for charging a plurality of batteries.

Another object of the present invention is to provide a charging apparatus that is capable of charging a plurality of batteries to substantially a predetermined charging quantity to each of the batteries without being influenced by the remaining quantity of electricity in the respective batteries.

A further object of the present invention is to provide a charging apparatus which is small sized and inexpensive.

Still a further object of the present invention is to provide a charging apparatus suited for charging a plurality of gas tight sealed batteries such as nickel-cadmium batteries.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a graph showing one example of the charging voltage characteristic of an inactive battery;

FIGS. 10A to 10C and FIGS. 11A to 11D are graphs showing waveforms for explaining the operation of the FIG. 8 embodiment;

FIG. 13 is a block diagram showing one example of an abnormal voltage detecting circuit, i.e. an abnormal high voltage detecting circuit;

FIGS. 14A to 14G are graphs showing waveforms for explaining the operation of the FIG. 13 embodiment;

FIG. 15 is a block diagram showing one example of an abnormal voltage detecting circuit, i.e. an abnormal low voltage detecting circuit;

FIGS. 17A to 17C and FIGS. 18A to 18C are graphs showing waveforms for explaining the operation of the FIG. 16 embodiment;

FIGS. 20A to 20H are graphs showing waveforms for explaining the operation of the FIG. 19 embodiment; and FIGS. 21A to 21H are graphs showing waveforms for explaining the operation in another aspect of the FIG. 19 embodiment.

DESCRIPTION OF THE PREFERRED EMBODIMENTS

Figure 1:
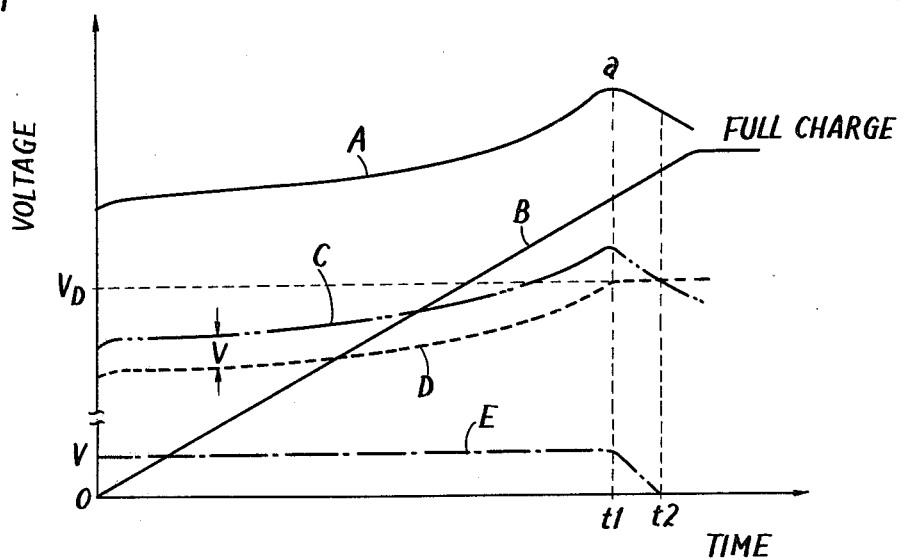
FIG. 1 is a graph showing a charging voltage characteristic of a gas tight sealed battery in which the present invention can be advantageously employed, wherein the abscissa indicates the charging time and the ordinate indicates the voltage.
Figure 2:
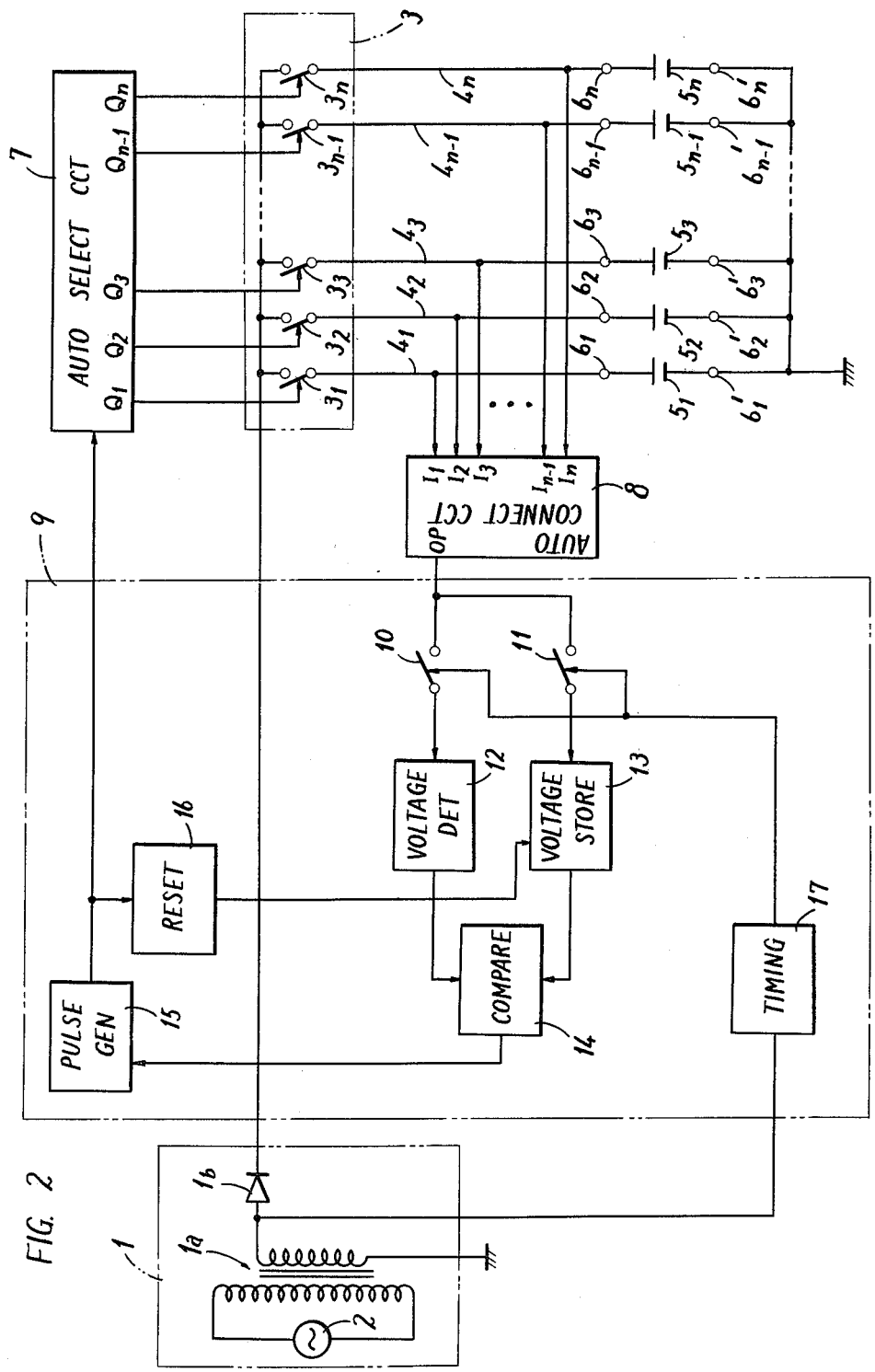
FIG. 2 is a block diagram of one embodiment of the present invention.

FIG. 2 is a block diagram showing a fundamental embodiment of the present invention. Referring to FIG. 2, a charging voltage source 1 comprises an alternating current voltage source 2 of such as a commercial power supply. The charging voltage source 1 further comprises a step-down transformer 1a and a rectifying diode 1b for rectifying the step-down output from the step-down transformer 1a. A charging current is individually applied from the charging voltage source 1 through the respective switches $3_1$, $3_2$, ... $3_n$ of a switching circuit 3 to the corresponding charging branches $4_1$, $4_2$, ... $4_n$, respectively. The charging branches $4_1$, $4_2$, ... $4_n$ each comprise battery blocks including batteries $5_1$, $5_2$, ... $5_n$, respectively, each being a nickel-cadmium battery, for example. These battery blocks are connected to the corresponding charging branches $4_1$, $4_2$, ... $4_n$, respectively, at connection terminals $6_1$, $6_2$, ... $6_n$ and $6_1'$, $6_2'$, ... $6_n'$, respectively. Meanwhile, each of the batteries $5_1$, $5_2$, ... $5_n$ has such a charging voltage characteristic as shown by the curve A in FIG. 1.

The switch circuit 3 comprises a plurality of switches $3_1$, $3_2$, ... $3_n$, which are ON/OFF controlled responsive to the corresponding outputs $Q_1$, $Q_2$, ... $Q_n$, respectively, of an automatic selecting circuit 7 operable responsive to the output from a control circuit 9 to be described subsequently. Each of the charging branches $4_1$, $4_2$, ... $4_n$ is connected to the corresponding one of the inputs $I_1$, $I_2$, ... $I_n$ of an automatic connecting circuit 8. The automatic connecting circuit 8 is implemented by a multiplexer, for example, which serves to selectively provide any one of the inputs $I_1$, $I_2$, ... $I_n$ to the output OP in association with the state of an automatic selecting circuit 7. The output OP of the multiplexer 8 is applied to the control circuit 9 for detecting a charged state of the battery now in a charging operation and for controlling a charging operation.

The control circuit 9 comprises switches 10 and 11. One end of each of these switches 10 and 11 is connected to the output OP of the above described automatic connecting circuit 8. The other end of the switch 10 is connected to a voltage detecting circuit 12 and the other end of the switch 11 is connected to a voltage storing circuit 13. The voltage detecting circuit 12 detects a terminal voltage of the battery now in a charging operation being supplied with a charging current through the switch 10 or a voltage in proportion thereto. The terminal voltage or the proportional voltage detected by the voltage detecting circuit 12 becomes as shown by the curve C in FIG. 1 and is applied to one input of a comparing circuit 14. The voltage storing circuit 13 is connected to receive a charging voltage of a battery now in a charging operation being supplied with a charging current through the switch 11. The voltage storing circuit 13 stores a voltage corresponding to the peak (denoted as a) appearing in the charging voltage characteristic of the battery shown by the curve A in FIG. 1 and lower, by a predetermined voltage V (FIG. 1) than the detected voltage from the voltage detecting circuit 12 at that time. Accordingly, the voltage being stored in the voltage storing circuit 13 becomes associated with the charging voltage characteristic A, as shown by the curve D in FIG. 1. The output voltage of the voltage storing circuit 13 is applied to the other input of the comparing circuit 14.

The comparing circuit 14 serves to compare the voltage supplied from the circuit 12 and the voltage supplied from the circuit 13 and provides the output of the low level, for example, when the difference between these two voltages becomes a predetermined value, (for example, zero). The output of the comparing circuit 14 is applied to a pulse generating circuit 15. The pulse generating circuit 15 comprises a monostable multivibrator, for example, and is responsive to the fall of the output of the comparing circuit 14 to provide single pulse. The single pulse from the pulse generating circuit 15 is applied to a reset circuit 16 and is also applied to the automatic selecting circuit 7. Accordingly, the automatic selecting circuit 7 is responsive to each application of the pulse to switch the battery being connected to the charging voltage source 1.

The control circuit 9 comprises a timing circuit 17. The timing circuit 17 is coupled to a secondary winding of the step-down transformer 1a included in the voltage source 1 and generates one timing pulse per each cycle of the alternating current voltage of the alternating current voltage source 2. The timing pulse obtained from the timing circuit 17 functions as an ON signal of the switches 10 and 11 and the switches 10 and 11 are turned on during a time period when the above described timing pulse is applied.

Now before entering into a description of the operation of the FIG. 2 diagram, a detecting operation of the charged state by the control circuit 9 will be described. By way of an example, it is assumed that the charging branch $4_1$ including the battery $5_1$ is connected to the charging voltage source 1 through the switch $3_1$. Accordingly, the battery voltage of the battery $5_1$ is provided from the output OP of the multiplexer or the automatic connecting circuit 8. Let it be assumed that the remaining quantity of electricity in the battery $5_1$ is now zero. When the switch (not shown) of the charging voltage source 1 turned on, a charging current is applied through the switch $3_1$ to the battery $5_1$ from the voltage source 1. The battery $5_1$ is charged based on the charging current being supplied in accordance with the charging voltage characteristic shown by the curve A in FIG. 1. On the other hand, the charging voltage of the battery $5_1$ now in a charging operation is applied to the voltage detecting circuit 12 and the voltage storing circuit 13 through the switches 10 and 11 closed per each cycle of the alternating current voltage of the alternating current voltage source 2. The output voltage of the voltage detecting circuit 12 changes in association with the battery voltage of the battery $5_1$ and in accordance with the characteristic shown by the curve C in FIG. 1 and the output voltage of the voltage storing circuit 13 changes in accordance with the characteristic shown by the curve D in FIG. 1. More specifically, the voltage storing circuit 13 stores a predetermined voltage $V_D$ (FIG. 1) at that time in association with the peak point a. Accordingly, the difference voltage V between the output voltage of the voltage detecting circuit 12 and the output voltage of the voltage storing circuit 13 changes in accordance with the characteristic as shown by the curve E in FIG. 1. Until the peak point a of the charging voltage characteristic A is reached, i.e. until t1, the output voltage of the voltage detecting circuit 12 is larger than the stored voltage of the voltage storing circuit 13.

When the curve passes the peak point a, the output voltage of the voltage detecting circuit 12 also gradually decreases in accordance with the charging voltage characteristic and therefore the voltage difference of these two voltages being applied to the comparing circuit 14 becomes gradually small as shown by the curve E in FIG. 1, and eventually the voltage difference becomes zero at the time t2. Accordingly, at the time t2 the output from the comparing circuit 14 becomes the high level and the monostable multivibrator or the pulse generating circuit 15 is triggered responsive to the fall of the output from the comparing circuit 14.

As described in the foregoing, the control circuit 9 used in the embodiment shown stores a predetermined voltage at that time when the peak point appearing in the charging voltage characteristic of a battery is reached and makes use of the fact that the battery voltage or a voltage proportional thereto of the battery now in a charging operation decreases after that peak point, such that a charged state is detected in association with the difference between the battery voltage or the proportional voltage and the stored voltage. Therefore, it is necessarily after the peak point appearing in the charging voltage characteristic that the difference between the above described two voltages becomes a predetermined value, say zero, and therefore the charging quantity can be more increased as compared with a conventional one. Although the charging completion detecting time point, i.e. the time t2 in FIG. 1 slightly fluctuates depending on the ambient temperature, such influence is decreased as compared with a conventional one.

On the assumption that the control circuit 9 shown in the FIG. 3 embodiment is adapted to perform the above described charged state detection, the operation of the FIG. 2 embodiment as a whole will be described with reference to the waveforms shown in FIGS. 3A to 3F.

Figure 3A:
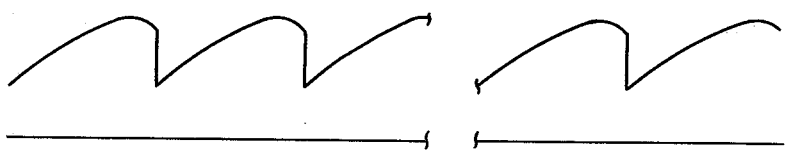
FIGS. 3A to 3F are graphs showing waveforms for explaining the operation of the FIG. 2 embodiment.
Figure 3B:
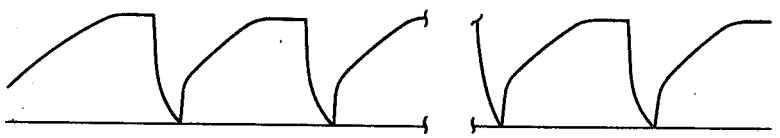
Figure 3C:
Figure 3D:
Figure 3E:
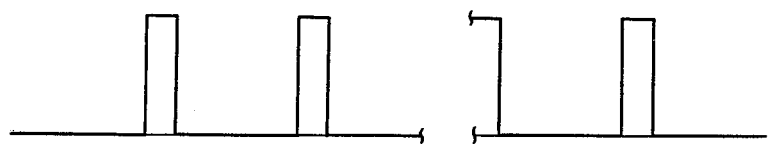
Figure 3F:
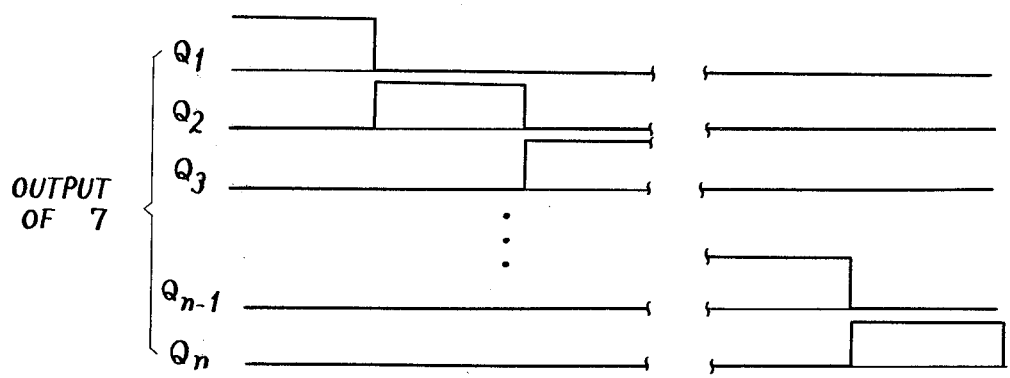

FIG. 3A shows a battery voltage, i.e. a voltage obtained at the output OP of the automatic connecting circuit 8, FIG. 3B shows a voltage stored in the voltage storing circuit 13, FIG. 3C shows a difference voltage between the voltage from the circuit 12 and the voltage from the circuit 13, FIG. 3D shows an output of the comparing circuit 14, FIG. 3E shows the output pulse from the pulse generating circuit 15, and FIG. 3F shows the outputs $Q_l$ to $Q_n$ of the automatic selecting circuit 7.

For the purpose of initiation of a charging operation, the automatic switching circuit 7 is reset to an initial state by means of an initializing means. Then, the automatic selecting circuit 7 brings the output $Q_1$ to the high level. Meanwhile, the automatic selecting circuit 7 comprises an (n+1)-nary ring counter. When the output $Q_1$ becomes the high level as shown in FIG. 3F, the switch $3_1$ of the switch circuit 3 is turned on. At the same time, the multiplexer or the automatic connecting circuit 8 is responsive to the output $Q_1$ of the circuit 7 to connect the output OP to the charging branch 4, i.e. to the input $I_1$. A charging current is applied from the charging voltage source 1 through the switch $3_1$ to the battery $5_1$ included in the charging branch $4_1$. Accordingly, the charging voltage of the battery $5_1$ increases as shown in FIG. 3A. Therefore, the stored voltage in the voltage storing circuit 13 also changes as shown in FIG. 3B. Difference between these two voltages becomes as shown in FIG. 3C. The output comparing circuit 14 falls to the low level at the timing when the difference voltage shown in FIG. 3C becomes zero, as shown in FIG. 3D. Accordingly, a single pulse as shown in FIG. 3E is obtained from the pulse generating circuit 15 and the single pulse is applied to the reset circuit 16 and the automatic selecting circuit 7. Therefore, the output from the automatic selecting circuit 7 becomes the low level and instead the output $Q_2$ becomes the high level. Therefore, the charging brach $4_1$ including the battery $5_1$ so far charged is separated from the charging voltage source 1 and instead the charging branch $4_2$ including the battery $5_2$ is connected to the voltage source 1 through the switch $3_2$. Accordingly, the battery $5_2$ starts being charged at the timing when the output $Q_2$ of the circuit 7 becomes the high level.

The reset circuit 16 is responsive to the single pulse from the pulse generating circuit 15 to reset the stored voltage in the voltage storing circuit 13 to substantially zero.

The automatic connecting circuit 8 is responsive to the output $Q_2$ of the automatic selecting circuit 7 becoming the high level to connect the charging branch $4_2$, i.e. the input $I_2$ to the output OP. Accordingly, the control circuit 9 serves to detect similarly the charged state of the battery $5_2$, as done previously in the battery $5_1$.

Similarly thereafter all the batteries $5_1$ to $5_n$ included in the charging branches $4_l$ to $4_n$ are rapidly charged in succession and individually.

Figure 4:
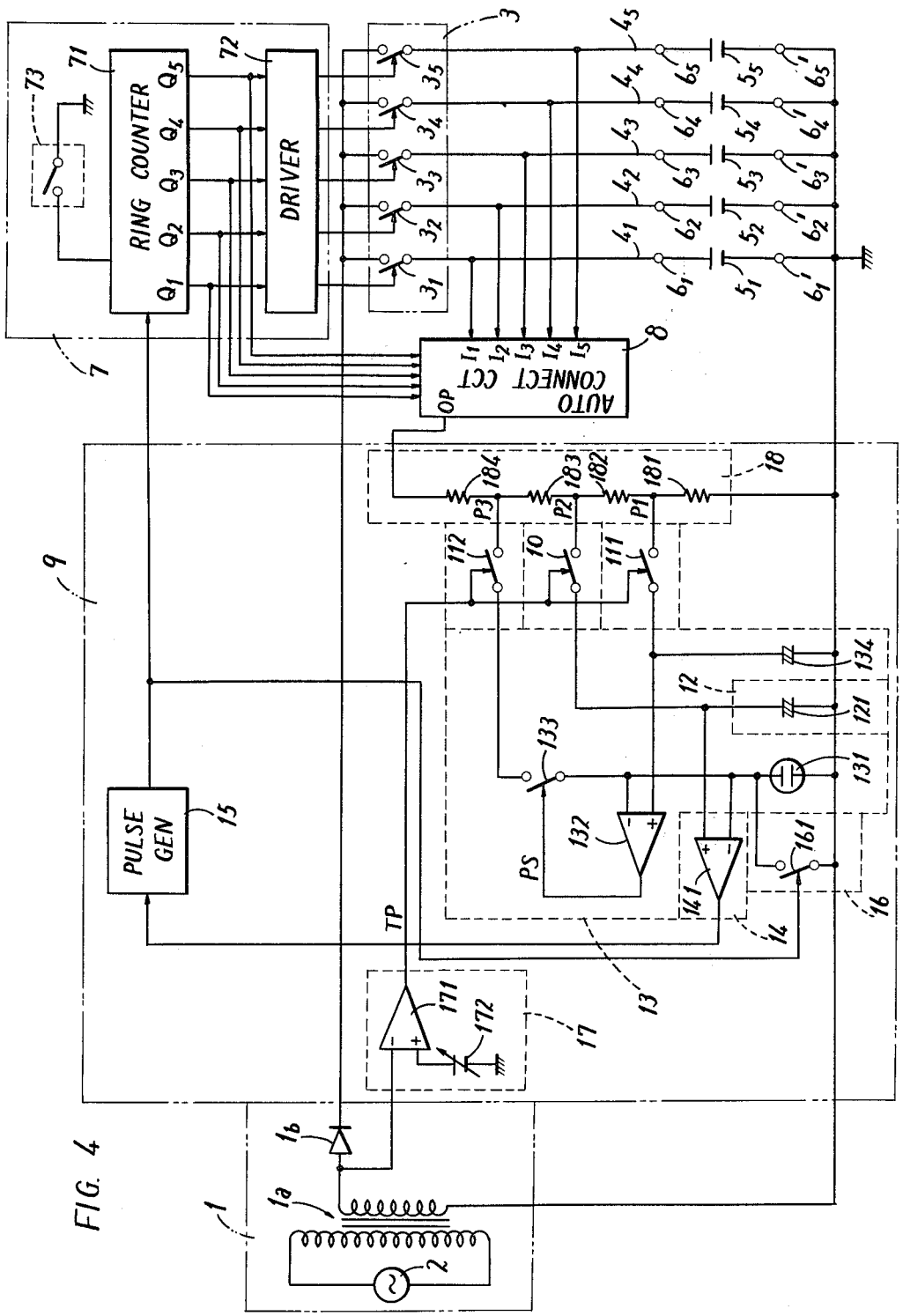
FIG. 4 is a schematic diagram of a preferred embodiment in accordance with the FIG. 2 embodiment.

FIG. 4 is a schematic diagram showing a preferred embodiment in accordance with the FIG. 2 diagram. Referring to FIG. 4, the number of the rechargeable batteries, i.e. the number of the charging branches is selected to be "5". The control circuit 9 comprises a voltage dividing circuit 18 connected to the output of the automatic connecting circuit, i.e. the multiplexer 8. The voltage dividing circuit 18 comprises a series connection of resistors 181, 182, 183 and 184 and one end of the series connection is connected to the previously described output OP, while the other end of the series connection is connected to the ground. The voltage dividing circuit 18 has three terminals P1, P2 and P3. The terminal P1 is connected to one end of the switch 111, the terminal P2 is connected to one end of the switch 10, and the terminal P3 is connected to one end of the switch 112. The other end of the switch 111 is connected to one input (+) of an operational amplifier 132 included in the voltage storing circuit 13 and is also connected to the ground through a capacitor 134. The other end of the switch 112 is connected to one end of the switch 133 included in the voltage storing circuit 13. The other end of the switch 133 is connected to the other input (−) of the operational amplifier 132 and is connected to a potential memory device 131 included in the circuit 13. The voltage stored in the potential memory device 131 is applied to one input (−) of the operational amplifier 141 constituting the comparing circuit 14. The other end of the switch 10 is connected to the ground through a capacitor 121 included in the voltage detecting circuit 12. The voltage detected by the capacitor 121 is connected to the other input (+) of the previously described operational amplifier 141.

Specifically, the above described voltage memory device 131 may comprise an electrochemical potential memory device. Such potential memory device is disclosed in U.S. Pat. No. 3,753,110 issued Aug. 14, 1973 to the same assignee as the present invention. However, an example of such electrochemical potential memory device will be briefly described.

Figure 5:
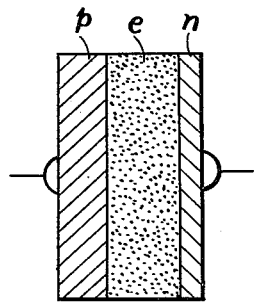
FIG. 5 is a schematic diagram showing one example of a potential memory device for use in the above described embodiment.
Figure 6:
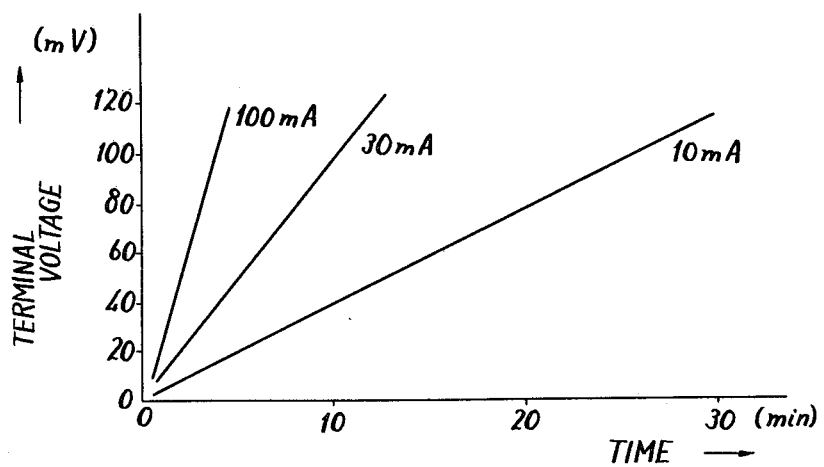
FIG. 6 is a graph showing a characteristic of a potential memory device shown in FIG. 5.

FIG. 5 is a sectional view showing a structure of the electrochemical potential memory device 131. The electrochemical potential memory device is a kind of a battery having a structure including a solid electrolyte material e having a high ion conductivity such as $RbAg_4I_5$ or $Ag_3SI$ sandwiched between the cathode n mainly including silver or an alloy of silver-selenium and an anode mainly including an alloy of silver-tellurium or an alloy or silver-selenium. In the charging mode of the potential memory device, Ag of Ag-Te in the anode p becomes a form of ions to be solved in the solid electrolyte e and to be emigrated to the cathode n. In the discharging mode of the potential memory device, Ag of the cathode n conversely emigrates toward and is deposited on the anode p. The electromotive force of the potential memory device as a battery depends on the active amount (the density) of Ag in the Ag-Te alloy. In the case where the atom composition ratio of Ag and Te in the alloy Ag-Te is approximately 2, the active amount of Ag largely changes even by a slight charge or discharge. A relation between the electromotive force and the charging/discharging quantity of electricity is as shown in FIG. 6, wherein the relation becomes generaly linear in the charging and discharging mode in the range of the electomotive force from zero to 100 mV, with the current density being smaller than 100 $\mu A/cm^2$.

Meanwhile, the electrochemical potential memory device has a characteristic of holding a potential immediately before a supply of the current to the device is interrupted in the range of the potential from zero to 100 mV. Such device has been manufactured by the assignee of the present invention in the trademark of "Memoriode".

Returning again to FIG. 4, the operational amplifier 141 included in the comparing circuit 14 functions to compare the voltage detected by the capacitor 121 included in the voltage detecting circuit 12 and the voltage stored in the potential memory device 131 included in the voltage storing circuit 13. The output of the operational amplifier 141 is applied to the pulse generating circuit 15.

On the other hand, the reset circuit 16 receiving the output of the pulse generating circuit 15 comprises a switch 161 which is turned on as a function of the pulse obtained from the pulse generating circuit 15. The switch 161 is connected in parallel with the potential memory device 131 included in the voltage storage circuit 13. Accordingly, when the switch 161 is turned on, the voltage stored in the potential memory device 131 is reset to approximately zero.

The timing circuit 17 comprises an operational amplifier 171 and one input (−) of the operational amplifier 171 is connected to the secondary winding of the stepdown transformer 1a. The circuit 17 comprises a reference voltage source 172 and the reference voltage source 172 is connected to the other input (+) of the operational amplifier 171. The operational amplifier 171 provides a timing pulse TP as an output therefrom, when the output of the step-down transformer 1a exceeds a voltage set by the reference voltage source 172. The switches 10, 111 and 112 are responsive to the timing pulse TP to be temporarily turned on during the timing pulse period.

The automatic selecting circuit 7 comprises a 6-nary counter 71 and the outputs $Q_1$ to $Q_5$ are applied to a driver 72 and also applied to the automatic connecting circuit 8. The driver 72 is responsive to the outputs $Q_1$ to $Q_5$ to turn the corresponding switches $3_1$ to $3_5$ on. Meanwhile, an initializing switch or a start switch 73 is connected to the counter 71. Accordingly, when the switch 73 is turned on, the output $Q_1$ of the counter 71 becomes the high level and accordingly the counter 71 is reset to an initial state.

In operation, the start switch 73 is turned on. Then, as described previously, only the output $Q_1$ of the counter 71 becomes the high level and the battery $5_1$ included in the charging branch $4_1$ starts being charged. The battery voltage of the battery $5_1$ is applied to the voltage dividing circuit 18 through the automatic connecting circuit 8. The voltage dividing circuit 18 voltage divides the applied battery voltage by means of the resistors 181 to 184, thereby to provide different voltages to the output terminals P1, P2 and P3.

Figure 7A:
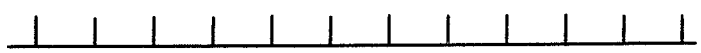
FIGS. 7A to 7F are graphs showing waveforms for explaining the operation of the FIG. 4 embodiment.
Figure 7B:
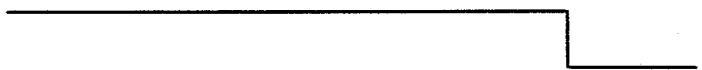
Figure 7C:
Figure 7D:
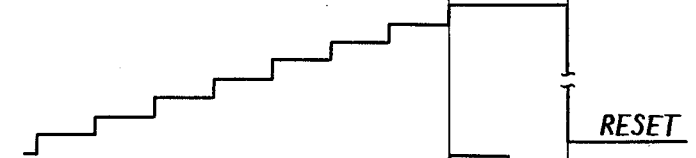
Figure 7E:
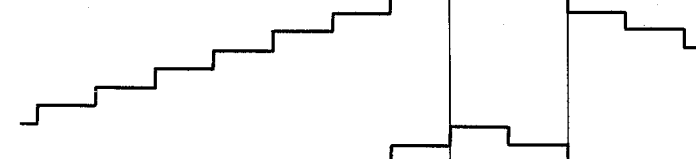
Figure 7F:
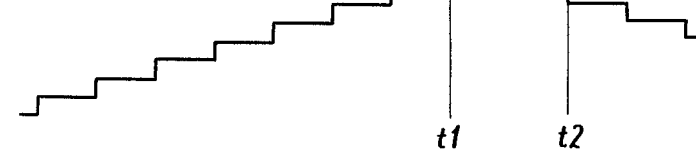

On the other hand, the timing pulse TP as shown in FIG. 7A is obtained from the operational amplifier 171 of the timing circuit 17 for each cycle of the alternating current voltage of the alternating current voltage source 2. The switches 10, 111 and 112 are responsive to the timing pulse TP to be turned on. Accordingly, the output voltages at the respective output terminals P1, P2 and P3 of the voltage dividing circuit 18 are each applied to the associated components at each timing pulse TP. Therefore, the capacitors 121 and 134 and the potential memory device 131 function to store the output voltages obtained from the corresponding output terminals P2, P1 and P3, as shown in FIGS. 7E, 7F and 7D, at each timing pulse TP. The operational amplifier 132 included in the voltage storing circuit 13 functions to compare the voltage stored in the potential memory device 131 and the voltage stored in the capacitor 134. The operational amplifier 132 provides a pulse signal PS when the voltage stored in the potential memory device 131 comes to have a predetermined voltage difference from the terminal voltage of the capacitor 134. Accordingly, the pulse signal PS is obtained in synchronism with the timing pulse TP (FIG. 7A), as shown in FIG. 7C. Since the switch 133 is responsive to the pulse signal PS to be turned on, the voltage stored in the potential memory device 131 follows the change of the terminal voltage across the capacitor 121 shown in FIG. 7E until the peak point (FIG. 1) of the charging voltage characteristic is reached, as shown in FIG. 7D. On the other hand, the terminal voltage across the capacitor 121 changes each time the switch 10 is turned on, thereby to follow the charging voltage characteristic A. After the peak point a of the charging voltage characteristic is reached, i.e. after the timing t1 (FIG. 1), the battery voltage of the battery $5_1$ gradually decreases and therefore the terminal voltages of the capacitors 121 and 134 also decreases as shown in FIGS. 7E and 7F. If and when the potential difference between the voltage stored in the potential memory device 131 and the terminal voltage across the capacitor 134 becomes smaller than a given predetermined value, the operational amplifier 132 comes not to provide the pulse signal PS, as shown in FIG. 7C. Therefore, the switch 133 is not turned on again and after the timing t1 the switch 133 remains off. Accordingly, the stored voltage of the potential memory device 131 is maintained constant after the timing t1 until the timing t2, as shown in FIG. 7D. If and when the voltage difference between the stored voltage of the potential memory device 131 and the terminal voltage across the capacitor 121 becomes a predetermined voltage difference, i.e. zero, then the output from the operational amplifier 141 included in the comparing circuit 14 falls to the low level, as shown in FIG. 7B. Then one pulse is obtained from the pulse generating circuit 15.

The switch 161 included in the reset circuit 16 is responsive to the pulse from the pulse generating circuit 15 to be turned on. Then the voltage stored in the potential memory device 131 included in the voltage storing circuit 13 is discharged through the switch 161 and the voltage of the device 131 abruptly falls to approximately zero.

The counter 71 is stepped up responsive to the pulse obtained from the pulse generating circuit 15 and the output $Q_2$ becomes the high level. When the output $Q_2$ becomes the high level, the battery $5_2$ included in the charging branch $4_2$ starts being charged, as previously described.

Thus the batteries $5_1$ to $5_5$ included in the respective charging branches $4_1$ to $4_5$ are individually and in succession charged and when the charging operation of the battery $5_5$ included in the final charging branches $4_5$ is completed, the counter 71 is responsive to the pulse from the pulse generating circuit 15 to be stepped up, so that the output $Q_6$ becomes the high level. However, since the output $Q_6$ is not applied to the driver 72, this means that the charging operation of all the batteries $5_1$ to $5_5$ is completed.

Meanwhile, one might consider an approach in which a voltage dividing circuit 18 is individually provided for each of the charging branches $4_1$ to $4_5$ without employing the automatic connecting circuit 8. However, in such a case accuracy of detection of the charged state is degraded. More specifically, in the case where a voltage dividing circuit is provided to each of the charging branches, it follows that the voltage dividing circuit is supplied with not only the voltage of a battery now in a charging operation but also with a voltage drop across the switches $3_1$ to $3_5$ associated with the respective charging branches. Such voltage drop across the switch circuit 3 is increased as a rapid charging rate of the battery is increased, while the same is different for each of the switches $3_1$ to $3_5$. Therefore, it further follows that the voltage applied to the voltage dividing circuit is different for each of the charging branches and accordingly accuracy of detection of the charged state of the battery now in a charging operation is degraded. By contrast, according to the embodiment shown, since the control circuit 9 is connected only to the charging branch including the battery now in a charging operation, accuracy of detection of the charged state is excellent.

Figure 8:
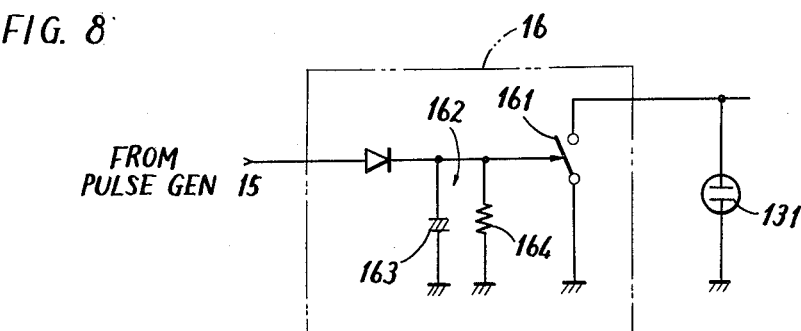
FIG. 8 is a schematic diagram of a major portion of a preferred embodiment of the reset circuit.

FIG. 8 is schematic diagram showing a preferred embodiment of the reset circuit. The reset circuit 16 of the embodiment shown comprises a delay circuit 162. The delay circuit 162 comprises a capacitor 163 and a resistor 164 and the switch 161 is operable responsive to the output therefrom. More specifically, when single pulse is provided from the pulse generating circuit 15, the single pulse is delayed by the delay circuit 162 and the switch 161 becomes operable after the lapse of a predetermined time period, whereby the potential memory device 131 included in the voltage storing circuit 13 is reset to an initial state. The FIG. 8 embodiment is particularly preferred in the case where the battery is an inactive battery.

Meanwhile, by an inactive battery is meant a battery in an inactive state which has been put in a discharged state for a long period of time or in the high temperature atmosphere, wherein an inactive film has been formed on the anode and cathode of the battery, so that an oxidizing and reducing reaction is temporarily dull to exhibit a large internal impedance. When such inactive battery is charged, the charging voltage characteristic becomes such characteristic as shown by the curve A' in FIG. 9, wherein the second peak appears as a feature as shown as a' due to the above described large internal impedance at the beginning of the charging operation. In such case the voltage storing circuit 13 stores the voltage $V_D'$ at the timing t1' of the peak point a' shown by the dotted line D' in FIG. 9. On the other hand, the output characteristic of the voltage detecting circuit 12 becomes as shown as the characteristic curve C' in proportion to the charging voltage characteristic curve A' and the output is obtained from the comparing circuit 14 at the timing t2' when the difference voltage between the output from the detecting circuit and the stored voltage $V_D'$ becomes zero, whereby a charging operation of the inactive battery is stopped, with the result that the inactive battery can not be charged to a predetermined charged state. In view of the fact that the peak point appearing in the charging voltage characteristic curve A' of the inactive battery appears at the beginning of the charging operation, a delay circuit 162 is provided in the reset circuit 16 as delay means for delaying the operation start time of the voltage storing circuit 13 so that the voltage storing circuit 13 may not operate at the beginning of the charging operation in charging a new battery. As a result, an inactive battery is charged to a predetermined charged state.

Since the structural features of the embodiment were described in the foregoing, the operation start of the potential memory device 131 will be described with reference to the waveforms shown in FIGS. 10A to 10C and 11A to 11C. FIGS. 10A to 10C show a case where the delay circuit 162 is not provided, whereas FIGS. 11A to 11C show a case where the delay circuit 162 is provided. When the charging operation of the first battery say $5_1$ is completed at the timing point t2, the monostable multivibrator 15 is responsive to the output of the comparing circuit 14 to provide the output pulse as shown in FIGS. 10A and 11A. In the absence of the delay circuit 162, the switch circuit 161 is turned on only during the time period of the output pulse, whereby the electric charge of the potential memory device 131 is discharged and the waveform of the voltage across the potential memory device becomes as shown in FIG. 10C, while the potential memory device 131 starts an operation for a charging operation of the second battery say $5_2$ at the timing point t3. In such a case, insofar as the battery being charged is a normal battery, it is sufficient if the voltage drop Vd across the potential memory device 131 during the pulse period is larger than a fluctuation of the stored voltage due to diversification of the characteristics of the batteries and therefore it may be adapted such that an electric charge of the potential memory device 131 is discharged during only that period. However, in the case where the second battery $3_2$ is an inactive battery, the peak point a' appears at the beginning of the charging operation, as described previously in conjunction with FIG. 9, and since the voltage at the start of the operation of the potential memory device 131 for a charging operation of the second battery $5_2$ is high, the potential memory device 131 immediately follows the charging voltage characteristic curve A' of the inactive battery, with the result that the charging operation of the inactive battery comes to a stop at the timing point t2' in FIG. 9.

By contrast, in the case where the delay circuit 162 is provided, the capacitor 163 of the delay circuit 162 is delayed by the output pulse obtained from the monostable multivibrator 15 and the electric charge of the capacitor 163 is discharged through the resistor 164 after the timing t3 when the pulse is ended. Accordingly, the switch circuit 161 is closed as shown in FIG. 11B only during a time period t4–t2 when the voltage exceeds a threshold value Vt of the voltage required for closing the switch circuit 161 and the electric charge of the potential memory device 131 is discharged as shown in FIG. 11C. Therefore, the voltage drop Vd' of the potential memory device 131 is large and the start timing t4 of the operation of the potential memory device 131 for a charging operation of the second battery $5_2$ is delayed. Accordingly, it follows that the voltage of the potential memory device 131 for the peak point a' in the charging voltage characteristic curve A' of the inactive battery is not followed and the inactive battery can be charged in substantially the same manner as in the case of the normal battery.

Figure 12:
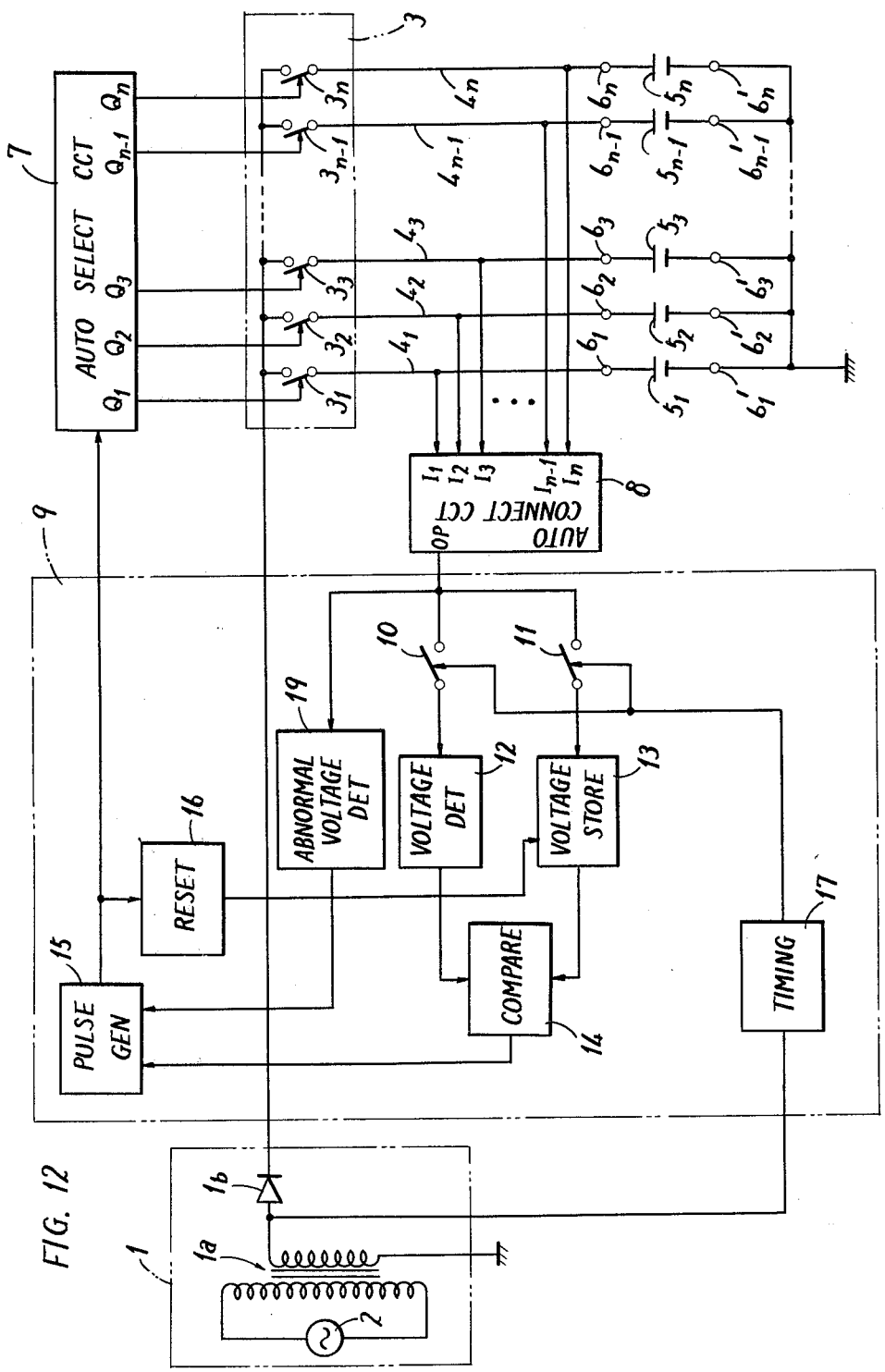
FIG. 12 is a block diagram showing another embodiment of the present invention.

FIG. 12 is a block diagram showing a further embodiment of the present invention. The FIG. 12 embodiment is almost the same as the FIG. 2 embodiment, except for the following respects and therefore only the different portions will be described, while a repetitive description will be omitted. Briefly described, the FIG. 12 embodiment is aimed to charge in succession on a plurality of batteries by skipping a battery of the charging branch causing an abnormal voltage. To that end, the FIG. 12 embodiment comprises an abnormal voltage detecting circuit 19 for detecting an abnormal voltage of a charging branch for charging a battery for enabling the pulse generating circuit 15 to provide a single pulse. The abnormal voltage detecting circuit 19 is aimed to detect an abnormal state, such as a case where no battery is interposed in the charging branch as selected for a charging operation, a case where a battery has not been properly mounted between the connecting terminals $6_1$ to $6_n$ and $6_1'$ to $6_n'$ of the selected charging branch, a case where a battery of the selected charging branch is an inactive battery an internally short-circuited battery, and so on.

FIG. 13 shows a detailed diagram of the abnormal voltage detecting circuit 19. The detecting circuit 19 is connected from the output OP of the automatic connecting circuit 8 for the purpose of detecting a voltage of the connection terminals $6_1$ to $6_n$, i.e. the battery voltage, and comprises an operational amplifier 191 for detecting whether the battery voltage is higher than the reference voltage $V_{RH}$ of the reference voltage source 192.

The operation of the FIG. 13 embodiment in the case where no abnormal voltage is detected is substantially the same as the operation of the FIG. 2 embodiment. In the following, therefore, the operation of the FIG. 13 embodiment in the case where an abnormal voltage is detected will be described. Now description will be made of a case where the battery $5_m$ is not inserted between the connection terminals $6_m$ and $6_m'$ of the m-th charging branch $4_m$. The batteries $5_1$ to $5_{m-1}$ of the first to (m−1)th charging branches $4_1$ to $4_{m-1}$ are in succession charged in the previously described manner. When the charging operation of the battery $5_{m-1}$ is completed, the output of the automatic selecting circuit 7 is changed from the output $Q_{m-1}$ to the output $Q_m$ and the switch $3_m$ of the switching circuit 3 is closed, so that the electric power from the power supply 1 is supplied to the charging branch $4_m$. However, since the battery $5_m$ is not interposed in the corresponding charging branch $4_m$, the voltage between the connecting terminals $6_m$ and $6_m'$ is high as compared with a case where a normal battery is connected therebetween. Such abnormal high voltage is detected by the detecting circuit 19 and the pulse generating circuit 15 is responsive to the output of the detecting circuit 19 to be enabled to provide a single pulse. The automatic selecting circuit 7 is responsive to the single pulse, so that the output is charged from the output $Q_m$ to the output $Q_{m+1}$. At the same time, the voltage stored in the storing circuit 13 is reset by the reset circuit 16 to the initial condition. The (m+1)th charging branch $4_{m+1}$ is supplied with electric power by the output $Q_{m+1}$ of the automatic selecting circuit 7 and the battery $5_{m+1}$ is charged and thereafter the batteries $3_{m+1}$ to $3_n$ are individually and in succession charged in the previously described manner.

FIGS. 14A to 14G are graphs showing the waveforms of electrical signals at various portions in the FIGS. 12 and 14 embodiment. FIG. 14A shows the battery voltage, FIG. 14B shows the voltage of the storing circuit 13, FIG. 14C shows the difference between the battery voltage or the proportional voltage thereof and the voltage of the storing circuit 13, i.e. the input of the comparing circuit 14, FIG. 14D shows the output of the comparing circuit 14, FIG. 14E shows the output of the detecting circuit 19, FIG. 14F shows the output of the pulse generating circuit 15, and FIG. 14G shows the selected outputs of the automatic selecting circuit 7. Meanwhile, in FIG. 10, the numerical numbers (1) to (n) denote the number of batteries and the number of charging branches.

As seen from the waveforms in FIG. 10, the single pulse $X_m$ is obtained from the pulse generating circuit 15 responsive to the output of the comparing circuit 14 at the timing t2' so that the output of the automatic selecting circuit 7 is changed from the output $Q_{m-1}$ to the output $Q_m$; however, in the absence of the battery $5_m$ in the m-th charging branch $4_m$, the battery voltage becomes higher than the reference voltage $V_{RH}$ and such state is detected by the detecting circuit 19 and the pulse generating circuit 15 is responsive to the output of the detecting circuit 19 to be enabled to provide a single pulse $X_m$ following the pulse $X_{m-1}$ at the timing t3', whereby the output of the automatic selecting circuit 7 becomes the output $Q_{m+1}$ at the same timing t3'.

Although in the foregoing a case where no battery is connected in the corresponding charging branch was described, such abnormal high battery voltage arises also in the case where the battery is an inactive battery and the FIG. 12 embodiment can be applied in such case as well. Even in case of a battery which is internally short-circuited, the FIG. 12 embodiment can be advantageously employed by detecting whether the battery voltage is higher than a predetermined minimum value using the detecting circuit 19.

FIG. 15 is a schematic diagram of the abnormal voltage detecting circuit 19 in the case where the circuit 19 is implemented as an abnormal low voltage detecting circuit. The detecting circuit 19 is connected to the output OP of the automatic connecting circuit 8 for the purpose of detecting the voltages at the connection terminals $6_1$ to $6_n$, i.e. the battery voltages. The circuit 19 comprises an operational amplifier 193, which functions to detect whether the battery voltage is lower than the reference voltage $V_{RL}$ of the reference voltage source 194. The detailed operation of the FIG. 15 embodiment is substantially the same as that of the FIG. 12 embodiment and thus the FIG. 13 embodiment, except that the previously described embodiment was adapted to detect an abnormally high voltage, whereas the embodiment now in description is adapted to detect an abnormally low voltage and therefore it is not believed necessary to describe the operation of the FIG. 15 embodiment in more detail.

Figure 16:
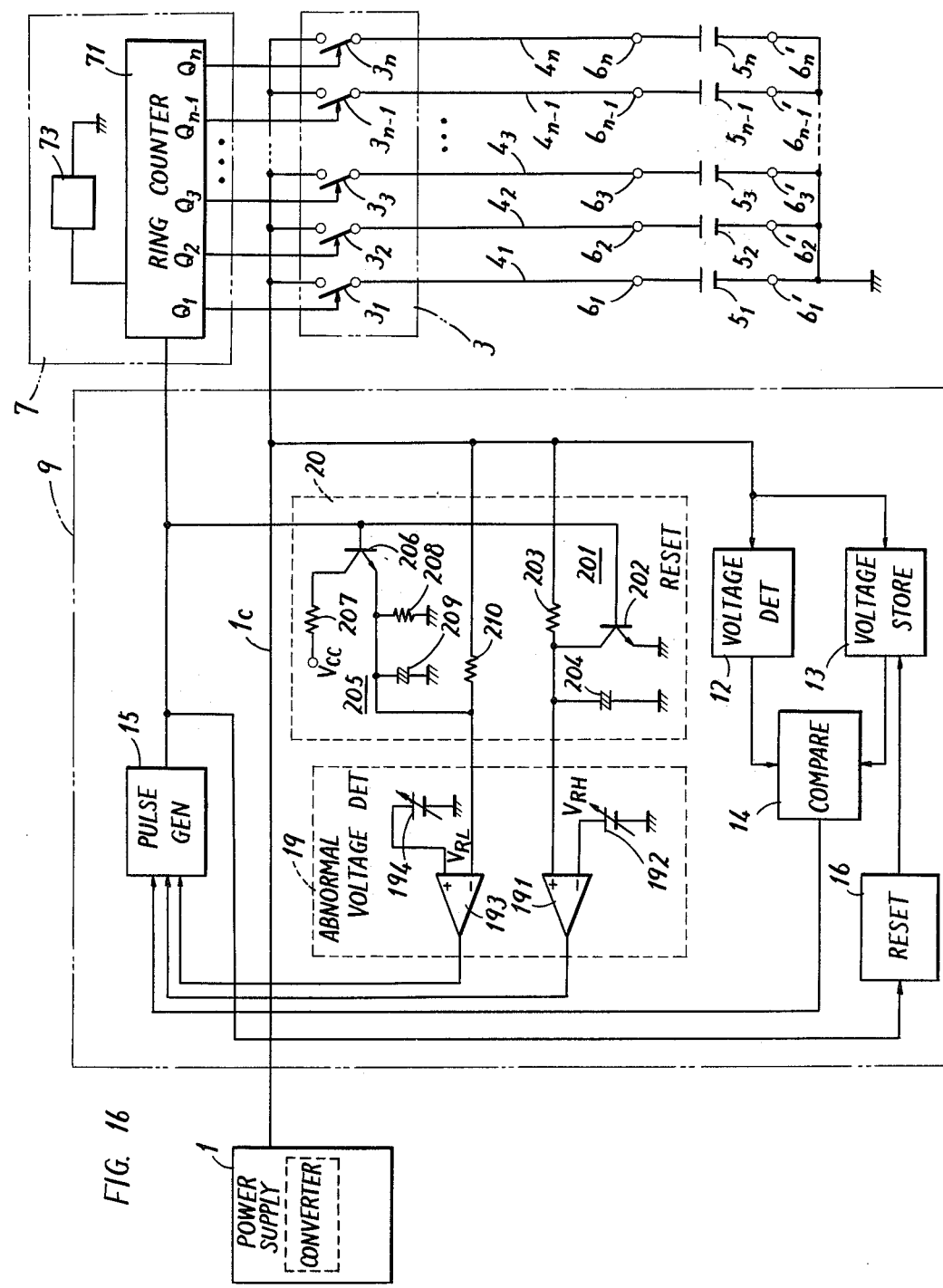
FIG. 16 is a schematic diagram showing in detail a major portion of still another embodiment of the present invention.

FIG. 16 is a schematic diagram of a major portion of another preferred embodiment including an abnormal voltage detecting circuit. The FIG. 16 embodiment does not employ the automatic connecting circuit 8, switches 10 and 11 and the timing circuit 17 employed in the previously described FIG. 12 embodiment. The FIG. 16 embodiment is particularly preferred in the case where the charging voltage source 1 comprises a smoothing circuit and a substantial direct current voltage is withdrawn from the output 1c.

A feature of the FIG. 16 embodiment is that a reset circuit 20 is provided. The reset circuit 20 is aimed to reset the abnormal voltage detecting circuit 19 responsive to switching of the charging branches. The voltage from the output 1c, i.e. the battery voltage of the battery in a charging operation, is applied to one input (+) of the operational amplifier 191 of the abnormal voltage detecting circuit 19 through a resistor 203 included in the reset circuit 201 and is also applied to one input (−) of another operational amplifier 193 included in the circuit 19 through a resistor 210 included in the reset circuit 205. These operational amplifiers 191 and 193 are connected to receive reference voltages $V_{RH}$ and $V_{RL}$, respectively, from the reference voltage sources 192 and 194, respectively, at other input of each of them, for the purpose of detecting an abnormal high voltage and an abnormal low voltage, respectively. The reset circuit 201 comprises a transistor 202 having the base electrode connected to the output of the pulse generating circuit 15, the collector electrode of the transistor 202 being connected to one input of the operational amplifier 191 and the emitter electrode of the transistor 202 being connected to the ground. A capacitor 204 is connected between one input of the operational amplifier 191 and the ground. On the other hand, the reset circuit 205 similarly comprises a transistor 206 having the base electrode connected to the output of the pulse generating circuit 15, the connector electrode of the transistor 206 being connected to the voltage Vcc through a resistor 207 and the emitter electrode of the transistor 206 being connected to the ground through a parallel connection of a resistor 208 and a capacitor 209. The emitter electrode of the transistor 209 is connected to one input of the operational amplifier 193. The resistor 203 and the capacitor 204 included in the reset circuit 201 constitute a delay circuit. Similarly, the resistor 208 and the capacitor 209 included in the reset circuit 205 constitute a delay circuit. These delay circuits functions to prevent the circuit 19 from operating immediately after the circuit 19 is reset responsive to one pulse provided from the pulse generating circuit 15, thereby to ensure that erroneous detecting operation is not made.

Let it be assumed that in the above described structure the battery $5_2$ included in the charging branch $4_2$ is a battery which is internally short-circuited. In such a case, when the charging branch $4_2$ is selected by the automatic selecting circuit 7, then the voltage at the line 1c is lower than the reference voltage $V_{RL}$ of the reference voltage source 194 and therefore an output is obtained from the operational amplifier 193. One pulse is obtained from the pulse generating circuit 15 responsive to the output from the operational amplifier 193 of the abnormal voltage detecting circuit 19 and the pulse is applied to the automatic selecting circuit 7, so that the next adjacent charging branch $4_3$ is selected.

Assuming that the battery $5_2$ has not been properly mounted between the connection terminals $6_2$ and $6_2'$ of the above described charging branch $4_2$, then a similar operation is performed responsive to the output obtained from the operational amplifier 191 of the abnormal voltage detecting circuit 19 and the next adjacent charging branch $4_3$ is selected.

Now referring to FIGS. 17A to 17C and 18A to 18C, an operation of the reset circuit 20 constituting a feature of the FIG. 16 embodiment will be described. FIGS. 17a, 17b and 17c shows a case where the reset circuit 20 is not provided, whereas FIGS. 18a, 18b and 18c shows a case where the circuit 20 is provided. First considering a case where the reset circuit 20 is not provided, referring to FIG. 17A, a charging operation of the first battery $5_1$ is completed at the timing point t1 and one pulse is obtained from the pulse generating circuit 15 and a charging operation of the second battery $5_2$ is started from the time point t2 after the period of the previously described pulse occurrence. In such a case, assuming that the first and second batteries $5_1$ and $5_2$ are normal and a properly mounted between the connection terminals $6_1$ and $6_1'$ and $6_2$ and $6_2'$, then during a charging period of each battery the input of the operational amplifier 193 is higher than the reference voltage $V_{RL}$ and the input of the operational amplifier 191 is lower than the reference voltage $V_{RH}$ and therefore the outputs are not obtained from the amplifiers 191 and 193. However, during a switching period of a charging operation of the batteries, i.e. during a time period of the above described single pulse occurrence, the inputs of both amplifiers 191 and 193 become the voltage at the common charging line 1c. During that time period a voltage waveform of the charging voltage source 1 appears at the common charging line 1c and, when a low frequency transformer is employed as a step-down transforming means of the charging voltage source 1, a rectified ripple current waveform of a commercial power supply frequency appears, whereas when a converter is utilized as a step-down means a switching waveform (an oscillating waveform) appears at the common charging line 1c. FIG. 17B shows an oscillating waveform W. The oscillating waveform W could be lower than the reference voltage $V_{RH}$ and could be higher than the reference voltage $V_{RL}$. Therefore, during a time period (t1–t2) of occurrence of the single pulse from the pulse generating circuit 15 the outputs of the operational amplifiers 191 and 193 of the abnormal voltage detecting circuit 19 could be in turn provided and accordingly the single pulse could be in turn generated, with the result that a supply of electricity through the charging branches $4_1$ to $4_n$ cannot be in succession switched.

The reset circuit 40 is provided for the purpose of eliminating the above described shortcoming. In such a case, as shown in FIG. 18, the transistor 206 is rendered conductive responsive to the single pulse during a time period (t1–t2) of occurrence of one pulse from the pulse generating circuit 15, whereby the input of the operational amplifier 193 is raised higher than the battery voltage V5 to be maintained in a reset state, while a portion of the oscillating waveform W is absorbed to be smoothed by the delay circuit of the circuit 205. Furthermore, the transistor 202 is rendered conductive responsive to the single pulse, whereby the input of the operational amplifier 191 is lowered to be lower than the reference voltage $V_{RH}$, whereby a portion of the oscillating waveform W is absorbed to be smoothed by the delay circuit of the circuit 201.

By thus providing the reset circuit 20, an influence of a rectified ripple current waveform of the commercial power supply frequency or the switching waveform of a converter from the charging voltage source 1 during the occurrence of one pulse from the pulse generating circuit 15 can be eliminated.

The delay circuits included in the reset circuits 201 and 205 not only absorb a portion of the above described ripple current component or a switching waveform to smooth the same but also have another function to be described in the following. More specifically, in the case where a battery being charged is an overdischarged battery, the voltage slowly rises after initiation of a charging operation of such overdischarged battery and, as in the case of an internally short-circuited battery, the battery voltage is lower than the reference voltage $V_{RL}$ at the beginning of a charging operation and therefore the delay circuit of the reset circuit 205 is provided so that the operational amplifier 193 may not sense such state. In the case where the respective switches $3_1$ to $3_n$ interposed in the charging branches $4_1$ to $4_n$ are implemented by relay switches, the contacts of such relay switches could cause a chattering phenomenon. Therefore, the relay switch could be instantaneously opening due to a chattering phenomenon and on the occasion of opened it could happen that the voltage of the common charging line 1c becomes higher than the reference voltage $V_{RH}$. Therefore, the delay circuit of the reset circuit 20 is provided so that the operational amplifier 191 may not sense such instantaneous situation.

Figure 19:
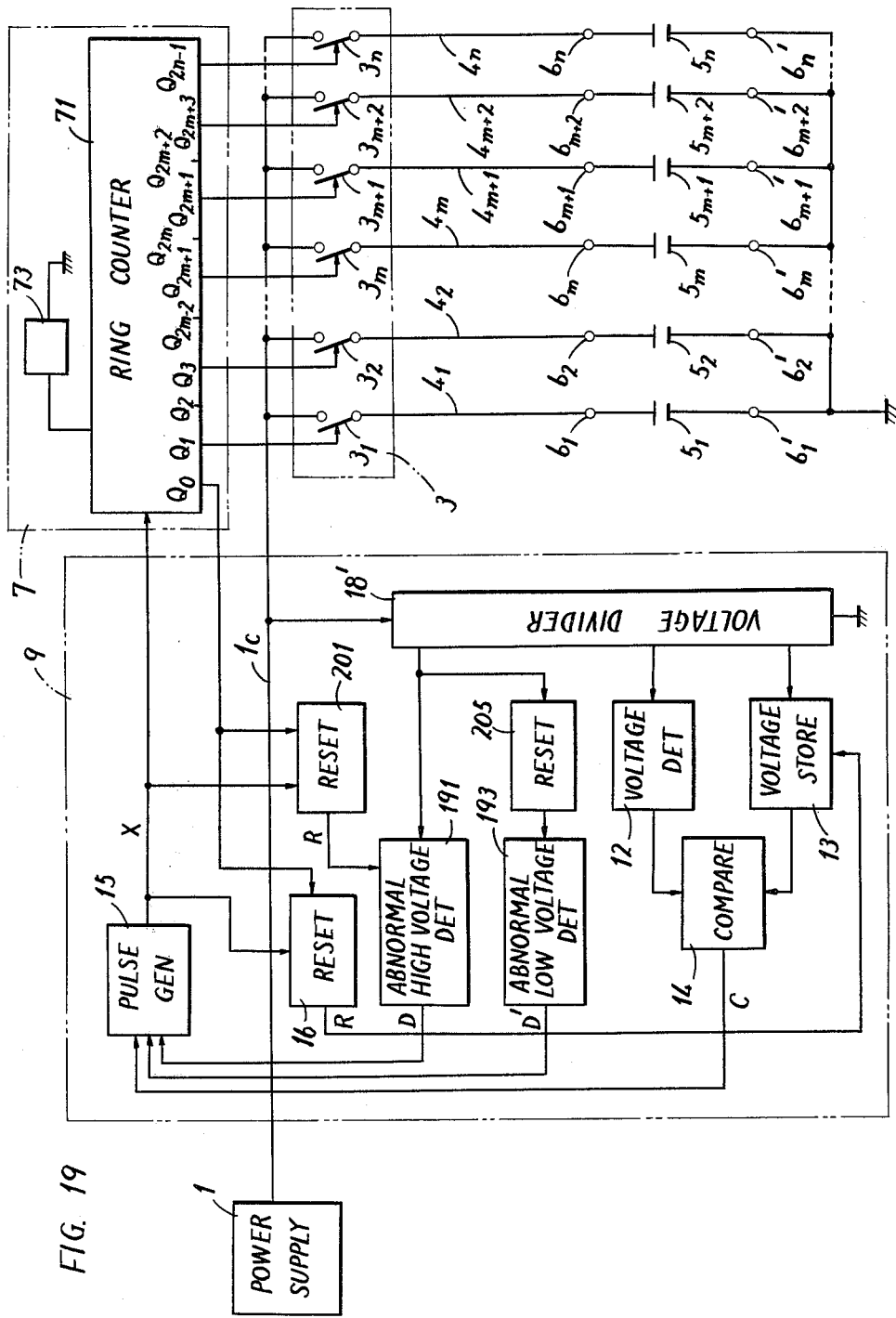
FIG. 19 is a block diagram showing another embodiment of the present invention.

FIG. 19 is a block diagram showing a further embodiment of the present invention. The embodiment shown is adapted such that the reset circuits 16 and 20 may be operable responsive to the initial output of the automatic selecting circuit 7, whereby the abnormal high voltage detecting circuit and the charged state detecting circuit, i.e. the voltage storing circuit may be reset on the occasion of turning on of the charging voltage source and on the occasion of completion of the charging operation.

The FIG. 19 embodiment is substantially the same as that of the FIG. 16 embodiment, except for the following respects. More specifically, the initial output $Q_0$ of the counter 71 constituting the automatic selecting circuit 7 is applied to the reset circuits 16 and 201. Accordingly, the high level output is obtained from the output $Q_0$ of the counter 71 responsive to operation of the start switch 73 included in the automatic selecting circuit 7 and the abnormal high voltage detecting circuit and the charged state detecting circuit and thus the voltage storing circuit 13 are reset. Meanwhile, the FIG. 19 embodiment comprises a voltage dividing circuit 18'. The voltage dividing circuit 18' may be structured in substantially the same manner as that of the voltage dividing circuit 18 previously described in detail with reference to FIG. 4.

Now referring to FIG. 20, an operation of the FIG. 19 embodiment will be described in the following. FIG. 20A shows a voltage being applied to the voltage dividing circuit 18', FIG. 20B shows a battery voltage, i.e. a voltage at the line 1c, FIG. 20C shows an output from the counter 71, FIG. 20D shows an output from the charged state detecting circuit, i.e. the output from the comparing circuit 14, FIG. 20E shows an output from the abnormal high voltage detecting circuit 191, FIG. 20F shows a pulse output from the pulse generating circuit 15, FIG. 20G shows an operation of the reset circuits 16 and 201, and FIG. 20H shows a signal from the start switch 73.

Now referring to the above described waveforms, an operation of the FIG. 19 diagram will be described. If and when the charging voltage source is turned on at the timing point t11, the automatic selecting circuit 7 provides the initial output $Q_0$ and the reset output $R_1$ is provided responsive to the initial output, as shown in FIG. 20G, whereby the charged state detecting circuit, i.e. the circuits 12 and 13 and the abnormal voltage detecting circuit 19 are brought to a reset state. If and when the start switch 73 is operated at the timing point t12, the start signal shown in FIG. 20H is applied to the counter 71 of the automatic selecting circuit 7 and the output of the counter 71 is changed from $Q_0$ to $Q_1$. The switch of the charging branch 41 is closed responsive to the output $Q_1$ and a charging operation of the battery $5_1$ is started. At that time no output is obtained from the reset circuits 16 and 201, i.e. the operation of the reset circuits 16 and 205 has been ended and the operation of the circuits 12, 13, 14 and 19 is started. When the timing point t13 is reached and a predetermined charged voltage of the battery $5_1$ is detected by the comparing circuit 14, the detected output $C_1$ is provided, as shown in FIG. 20D. Single pulse $X_1$ is provided from the pulse generating circuit 15 responsive to the detected output $C_1$ and the output of the counter 71 of the automatic selecting circuit 7 is switched to $Q_2$ responsive to the above described single pulse $X_1$. At the same time, the reset circuits 16 and 201 operate, thereby to provide the output $R_2$, whereupon the respective circuits 13 and 19 are reset during the above described operation period. The output $Q_2$ of the counter 71 does not close the switch of any of the charging branches and when the timing point t14 is reached where the reset time period is ended immediately the detected output $D_1$ is provided from the abnormal high voltage detecting circuit 191. Single pulse $X_2$ is provided from the pulse generating circuit 15 responsive to the above described detected output $D_1$ and the output of the counter 71 is switched to $Q_3$ responsive to the above described single pulse $X_2$. The switch $3_2$ of the charging branch $4_2$ is closed responsive to the output $Q_3$, whereby a charging operation of the battery $5_2$ is started. At the beginning of a charging operation of the battery $5_2$ the reset circuits 16 and 201 are reset responsive to the above described single pulse $X_2$ to provide the output $R_3$; however, since the time period of occurrence of the reset output $R_3$ is short, the reset output $R_3$ does not exert any influence upon the detecting operation by the circuits 12, 13, 14 and 19. Thereafter likewise the batteries $5_2$ to $5_n$ of the respective charging branches $4_2$ to $4_n$ are in succession charged. When the timing point t2n+1 is reached, the predetermined charged voltage of the battery $5_n$ of the charging branch $4_n$ is detected by the circuits 12, 13 and 14 and the detected output $C_n$ is provided from the comparing circuit 14. Single pulse $X_{2n-1}$ is provided from the pulse generating circuit 15 responsive to the detected output $C_n$ and the output of the counter 17 is switched from $Q_{2n-1}$ to the initial $Q_0$ and the respective detecting circuits are reset responsive to the reset outputs $R_{2n}$ from the reset circuits 16 and 205 which are reset responsive to the above described initial output.

As described in the foregoing, the embodiment is adapted such that on the occasion of turning on of the charging voltage source and on the occasion of completion of a charging operation of all the batteries $5_1$ to $5_n$ the respective detecting circuits are brought to a reset state; however, in the case where the respective detecting circuits are not retained in a reset state on the occasion of turning on of the charging voltage source and on the occasion of completion of a charging operation of all the batteries $5_1$ to $5_n$ single pulse X is provided from the pulse generating circuit 15 responsive to the detected output from the abnormal high voltage detecting circuit 191, whereupon it follows that the batteries $5_1$ to $5_n$ a charging operation of which was completed are repeatedly charged, with the result that a charging completion state of all the batteries becomes unclear and in particular at the beginning of a charging operation which of the batteries $5_1$ to $5_n$ of which of the charging branches $4_1$ to $4_n$ is to be first charged is unclear. Thus a problem is involved that an automatic switching control of a plurality of charging branches $4_1$ to $4_n$ is difficult.

According to the FIG. 19 embodiment, however, the reset circuits 16 and 201 for resetting the above described charged state detecting circuit and the abnormal high voltage detecting circuit are operated responsive to the initial output of the automatic selecting circuit for switching in succession a plurality of charging branches individually having batteries being charged and these detecting circuits are retained in a reset state on the occasion of turning on of the charging voltage source and on the occasion of completion of a charging operation and, therefore, a malfunction or self-running of the above described detecting circuits and the automatic selecting circuit can be prevented.

Now for the purpose of describing the feature of the FIG. 19 embodiment, another aspect of operation of the FIG. 19 embodiment will be described with reference to FIGS. 21A to 21H. FIG. 21A shows a voltage being applied to the voltage dividing circuit 18', FIG. 21B shows a battery voltage, i.e. a voltage at the line 1c, FIG. 21C shows an output of the counter 71, FIG. 21D shows an output from the charged state detecting circuit, i.e. an output from the comparing circuit 14, FIG. 21E shows an output from the abnormal high voltage detecting circuit 191, FIG. 21F shows an output from the abnormal low voltage detecting circuit 193, FIG. 21G shows a pulse output from the pulse generating circuit 15, and FIG. 21H shows an operation of the reset circuits 16 and 201.

If and when the charging voltage source 1 is turned on at the timing point t11, the initial output $Q_0$ is obtained from the counter 71 of the automatic selecting circuit 7 and the reset output $R_1$ is obtained from the reset circuits 16 and 201 responsive to the above described initial output. The charged state detecting circuit, i.e. the voltage storing circuit 13 and the abnormal high voltage detecting circuit 191 are reset responsive to the above described reset output $R_1$. Since the initial output $Q_0$ does not close any of the switches $3_1$ to $3_n$ of the respective charging branches $4_1$ to $4_n$, the resistor voltage dividing circuit 18' is supplied with an open voltage of the common charging path 1c and, since the above described open voltage is higher than the voltage when the battery is charged, no output is provided from the abnormal low voltage detecting circuit 193. Such state is maintained until the start signal is obtained from the start switch 73.

When the start signal is applied from the start switch 73 to the counter 71 at the timing t12, the output of the counter 71 is switched from the initial output $Q_0$ to the next output $Q_1$. The switch $3_1$ of the charging branch $4_1$ is closed responsive to the output $Q_1$, whereby a charging operation of the battery $5_1$ is started. At the timing point t12 the reset output disappears and therefore the charged state detecting circuit 9 and the abnormal high voltage detecting circuit 191 start operating.

At the timing point t13 the comparing circuit 14 detects a predetermined charged state of the battery $5_1$ to determine that the battery $5_1$ is in a predetermined charged state, thereby to provide the detected output $C_1$. Single pulse $X_1$ is provided from the pulse generating circuit 15 responsive to the detected output $C_1$. The output of the counter 71 is switched from $Q_1$ to $Q_2$ responsive to the above described one pulse $X_1$ and the switch $3_1$ is opened, whereby a charging operation of the battery $5_1$ is completed. The reset output $R_2$ is provided from the reset circuits 16 and 201 responsive to the above described one pulse $X_1$. The charged state detecting circuit and the abnormal high voltage detecting circuit 191 are reset responsive to the reset output $R_2$. Since any of the switches $3_1$ to $3_n$ are not closed, the output $Q_2$ of the counter 71 becomes an open voltage obtained at the common charging path 1c. On the other hand, the period of the reset output $R_2$ is the period of the above described single pulse $X_1$ and the abnormal high voltage detecting circuit 191 which was reset at the timing point t14 when the above described period is ended detects through the resistor voltage dividing circuit 18' that the open voltage of the common charging path 1c is higher than the reference voltage $V_{RH}$ of the above described detecting circuit, whereby the detected output $D_1$ is provided. Single pulse $X_2$ is provided again from the pulse generating circuit 15 responsive to the above described detected output $D_1$ and the output of the counter 71 is switched from $Q_2$ to $Q_3$ responsive to the above described single pulse $X_2$ and the switch $3_2$ of the charging branch $4_2$ is closed responsive to the above described output, whereby a charging operation of the battery $5_2$ is started. The reset signal $R_3$ is provided from the reset circuits 16 and 102 responsive to the above described single pulse $X_2$ and the circuits 13 and 191 are reset only during the time period of the reset signal. Therefore, the operation of both circuits 13 and 191 starts operating after the end of the period of the reset signal $R_3$; however, since the reset signal period is short with respect to the charging period of the battery $5_2$ the reset signal period in the charging period does not exert any influence upon the operation.

At the timing point t15 a predetermined charged state of the battery $5_2$ is detected by the charged state detecting circuit to provide the detected output $D_2$ and similarly to the foregoing description a charging operation of the battery $5_2$ is completed.

In the case where all the batteries are normal batteries and are connected properly between the connection terminals $6_1$ to $6_n$ and $6_1'$ to $6_n'$, then likewise thereafter the batteries are charged in succession up to the battery $5_n$ and at the timing point t2n the predetermined charged state of the battery $5_n$ is detected by the comparing circuit 14 to provide the detected output $Q_n$, when the output of the counter 71 is switched to the initial output $Q_0$ responsive to the single pulse $X_{2n-1}$ and the circuits 13 and 191 are reset by the reset signal $R_{2n-1}$ responsive to the single pulse $X_{2n-1}$. After disappearance of the single pulse $X_{2n-1}$ the reset signal $R_1$ is consequently provided from the initial output $Q_0$.

Now assuming that the batteries $5_m$ and $5_{m+1}$ are short-circuited batteries which are internally short-circuited, then the normal batteries $5_1$ to $5_{m-1}$ are normally charged in the above described manner. Responsive to the detected output $C_{m-1}$ appearing at the timing point t2m−2 when the charging operation of the battery $5_{m-1}$ is ended, the single pulse $X_{2m-2}$ and the reset signal $R_{2m-2}$ are provided and the output of the counter 7 is switched from $Q_{2m-3}$ to $Q_{2m-2}$, while the circuits 13 and 191 are reset during the time period of the reset signal $R_{2m-2}$. The open voltage of the common charging path 1c is at the timing point t2m−1 when the above described period is ended is detected by the abnormal high voltage detecting circuit 191 to provide the detected output $D_{m-1}$ and the output of the counter 71 is switched from $Q_{2m-2}$ to $Q_{2m-1}$ responsive to the above described single pulse $X_{2m-1}$, whereby a charging operation of the battery $5_m$ is started from the timing point t2m−1. Since the battery $5_m$ is a short-circuited battery, the battery terminal voltage is lower than the reference voltage $V_{RL}$ of the abnormal low voltage detecting circuit 193 and such state is detected by the circuit 193 at the timing point t2m when the reset signal $R_{2m-1}$ is ended, thereby to provide the detected output $D_1$. The single pulse $X_{2m}$ is provided responsive to the output $D_1'$ and the output of the counter 71 is switched to $Q_{2m}$, whereby a charging operation of the battery $5_m$ is stopped and the circuits 3 and 191 are reset responsive to the reset signal $R_{2m}$. Since any of the switches $3_1$ to $3_n$ is not closed by the output $Q_{2m}$ of the counter 71 until before the timing point t2m+1 when the one pulse $X_{2m}$ is ended, the common charging path 1c becomes a high open voltage and the circuit 193 is reset responsive to the above described open voltage. At the timing point t2m+1 the above described open voltage is detected by the abnormal high voltage detecting circuit 191 to provide the detected output $D_m$ and the output of the counter 71 is switched from $Q_{2m}$ to $Q_{2m+1}$ responsive to single pulse $X_{2m+1}$, whereby a charging operation of the next battery $5_{m+1}$ is started.

However, since the battery $5_{m+1}$ is also a short-circuited battery, at the time point t2m+2 when the reset signal $R_{2m+1}$ is ended again the abnormal low voltage detecting circuit 193 detects that the battery $5_{m+1}$ is a short-circuited battery, thereby to provide the output $D_2'$ and, as in the case of the battery $5_m$, a charging operation of the battery $5_{m+1}$ is stopped, thereby to proceed to a charging operation of the next battery $5_{m+2}$.

Now assuming that the batteries $5_m$ and $5_{m+1}$ are not connected between the connection terminals of the charging branches $4_m$ and $4_{m+1}$, then the detected output is provided at the timing point t2m when the reset signal $R_{2m-1}$ is ended on the occasion of a supply of a charging current to the charging branch $4_m$ due to closure of the switch $3_m$ and the detected output $D_{2m+1}$ is provided at the timing point t2m+2 when the reset signal $R_{2m+1}$ is ended on the occasion of a supply of a charging current to the charging branch $4_{m+1}$ due to closure of the switch $3_{m+1}$ and a supply of a charging current to the respective charging branches $4_m$ and $4_{m+1}$ is stopped responsive to generation of single pulses $X_{2m}$ and $X_{2m+2}$.

In the case where an open voltage of the charging voltage source 1 does not appear on the common charging path 1c in the course of switching of a plurality of charging branches, the circuit 193 cannot be reset and, if the circuit 191 is not forcibly reset responsive to the reset signal of the reset circuit 201, the circuit 191 cannot be reset. Accordingly, in the case where either circuit 191 or 193 is forcibly reset, the second occurrence of an abnormal voltage cannot be detected when adjacent charging branches exhibit an abnormal voltage on the occasion of a supply of a charging current. Therefore, a problem arises that an excessive current continually flows in the charging apparatus or a charging branch being supplied after the above described charging branch exhibiting the second occurrence of an abnormal voltage is not supplied with a charging current. However, according to the embodiment so far described, the charged state detecting circuit, the abnormal high voltage detecting circuit and the abnormal low voltage detecting circuit can be reset after completion of a supply of a charging current to a charging branch now in a charging operation and therefore, even in the case where adjacent charging branches supplied with a current in succession exhibit an abnormal low voltage or an abnormal high voltage on the occasion of a supply of a charging current, such abnormal state can be detected and a supply of a charging current to charging branches can be accurately controlled.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for charging a plurality of rechargeable batteries of the type having a charging voltage characteristic which exhibits an increase until a peak shortly before a fully charged state is reached and thereafter exhibits a gradual decrease until a fully charged state is reached, comprising:
   a plurality of charging branches, each including one of said plurality of rechargeable batteries;
   a charging voltage source for supplying a charging current to each of said rechargeable battery through each of said charging branch;
   charging state detecting means coupled to said rechargeable battery in a charging operation for detecting a charging state of said rechargeable battery wherein said charging state detecting means includes charging completion detecting means for detecting a charging completion state of said rechargeable battery responsive to said charged voltage of said rechargeable battery, said charging completion detection means comprises: associated voltage providing means coupled to said rechargeable battery in a charging operation for providing a voltage associated with a terminal voltage of said rechargeable battery in a charging operation, voltage storage means for storing a voltage lower by a predetermined voltage than said associated voltage corresponding to said peak of said charging voltage characteristic said lower voltage being based on said associated voltage from said associated voltage providing means, and comparing means for comparing said stored voltage in said voltage storing means and said associated voltage from said associated voltage providing means after said peak of said charging voltage characteristic is reached;
   automatic switching means responsive to the output of said charging state detecting means for selectively and automatically switching said charging branches being supplied with said charging current from said charging voltage source.

2. A charging apparatus in accordance with claim 1, which further comprises
   abnormal voltage detecting means for detecting an abnormal voltage of said charging branch newly switched to receive said charging current from said charging voltage source by means of said automatic switching means.

3. A charging apparatus in accordance with claim 2, which further comprises
   switching means responsive to the output of said abnormal voltage detecting means for switching said charging branch being supplied with said charging current from said charging voltage source.

4. A charging apparatus in accordance with claim 2 or 3, wherein
   said abnormal voltage detecting means comprises abnormal high voltage detecting means for detecting that an abnormal high voltage is generated in said charging branch.

5. A charging apparatus in accordance with claim 2, wherein
   said automatic switching means is adapted to be responsive to the output of said abnormal voltage detecting means for automatically switching said charging branch being supplied with said charging current from said charging voltage source.

6. A charging apparatus in accordance with claim 2, which further comprises
   second reset means responsive to said switching by said automatic switching means for resetting said abnormal voltage detecting means.

7. A charging apparatus in accordance with claim 2 or 6, wherein
   said abnormal voltage detecting means comprises abnormal low voltage detecting means for detecting that an abnormal voltage is generated in said charging branch.

8. A charging apparatus in accordance with claim 1, which further comprises
   pulse generating means responsive to the output of said charging state detecting means for generating single pulse, and wherein
   said automatic switching means is adapted to be responsive to said single pulse from said pulse generating means for making said switching operation.

9. A charging apparatus in accordance with claim 8, which further comprises first resetting means responsive to said single pulse from said pulse generating means for resetting said charged state detecting means to an initial state.

10. A charging apparatus in accordance with claim 9, wherein
said pulse generating means is adapted to be responsive to the output from said comparing means for generating said single pulse.

11. A charging apparatus in accordance with claim 10, wherein
said first reset means is adapted to reset said voltage storing means.

12. A charging apparatus in accordance with claim 11, which further comprises
second reset means responsive to said single pulse obtained from said pulse generating means for resetting said abnormal voltage detecting means to an initial state.

13. A charging apparatus in accordance with claim 12, wherein
said charging completion detecting means is commonly employed for said plurality of charging branches, and which further comprises
automatic connection means responsive to switching of said automatic switching means for automatically connecting said charging completion detecting means to said charging branch which was selected to be supplied with said charging current from said charging voltage source among said plurality of charging branches.

14. A charging apparatus in accordance with claim 12, which further comprises
reset means responsive to switching of said automatic switching means for resetting said charging state detecting means to an initial state.

15. A charging apparatus in accordance with claim 14, wherein
said reset means comprises pulse generating means responsive to said switching of said automatic switching means for generating single pulse, and
said charging state detecting means is adapted to be reset responsive to said single pulse.

16. A charging apparatus in accordance with claim 15, wherein
said pulse generating means being adapted to be responsive to the output of said comparing means for generating said single pulse.

17. A charging apparatus in accordance with claim 14, 15, or 16, which further comprises
delay means for delaying a predetermined time period said resetting of said charging state detecting means by said resetting means.

18. A charging apparatus in accordance with claim 8, 9, 10 or 11, which further comprises
abnormal voltage detecting means for detecting an abnormal voltage of said charging branch newly switched to be supplied with said charging current from said charging voltage source,
the output of said abnormal voltage detecting means being applied to said pulse generating means, said pulse generating means being responsive to the output of said abnormal voltage generating means for generating said single pulse.

19. A charging apparatus in accordance with claim 18, wherein
said abnormal voltage detecting means comprises abnormal high voltage detecting means for detecting that an abnormal high voltage is generated in said charging branch.

20. A charging apparatus in accordance with claim 18, wherein
said abnormal voltage detecting means comprises abnormal low voltage detecting means for detecting that an abnormal low voltage is generated in said charging branch.

21. A charging apparatus in accordance with claim 18, wherein
said abnormal voltage detecting means comprises
abnormal high voltage detecting means for detecting that an abnormal high voltage is generated in said charging branch, and
abnormal low voltage detecting means for detecting that an abnormal low voltage is generated in said charging branch,
the output of said abnormal high voltage detecting means and the output of said abnormal low voltage detecting means being applied to said pulse generating means.

22. A charging apparatus in accordance with claim 8, which further comprises
initializing means for initializing said automatic switching means, and
third reset means responsive to said intialization by said initializing means for resetting said charging state detecting means.

23. A charging apparatus in accordance with claim 22, which further comprises
abnormal voltage detecting means for detecting an abnormal voltage in said charging branch newly switched to be supplied with said charging current from said charging voltage source,
said third reset means being responsive to said initialization by said initializing means for resetting said abnormal voltage detecting means to an initial state.

* * * * *